(12) United States Patent
Korenaga et al.

(10) Patent No.: US 7,184,617 B2
(45) Date of Patent: Feb. 27, 2007

(54) PORTABLE DEVICE

(75) Inventors: Tsuguhiro Korenaga, Katano (JP); Kunio Hibino, Hirakata (JP); Nobuki Itoh, Kitakatsuragi-gun (JP); Mikihiro Shimada, Daito (JP); Yoshihiro Tomita, Osaka (JP); Yasushi Nakagiri, Kyotanabe (JP); Satoru Tomekawa, Yokohama (JP); Seiji Karashima, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 33 days.

(21) Appl. No.: 11/076,068

(22) Filed: Mar. 10, 2005

(65) Prior Publication Data

US 2005/0201693 A1 Sep. 15, 2005

(30) Foreign Application Priority Data

Mar. 12, 2004 (JP) ............................. 2004-070783
Jun. 23, 2004 (JP) ............................. 2004-184714

(51) Int. Cl.
*G02B 6/00* (2006.01)
*G02B 6/12* (2006.01)

(52) U.S. Cl. ............................. 385/14; 385/15; 385/32
(58) Field of Classification Search ................... 385/14
See application file for complete search history.

(56) References Cited

U.S. PATENT DOCUMENTS 4,864,523 A * 9/1989 Sasaki ........................ 361/680
5,375,184 A * 12/1994 Sullivan ...................... 385/129
6,950,087 B2 * 9/2005 Knox et al. .................. 345/102
6,961,234 B2 * 11/2005 Tanaka et al. ............... 361/681
6,963,680 B2 * 11/2005 Lempkowski et al. ........ 385/26
6,968,097 B2 * 11/2005 Arima et al. .................. 385/14
2002/0181882 A1* 12/2002 Hibbs-Brenner et al. ...... 385/52
2005/0160186 A1* 7/2005 Ruiz ............................ 710/1

FOREIGN PATENT DOCUMENTS

| JP | 55106407 A | * | 8/1980 |
| JP | 1-166629 | | 6/1989 |
| JP | 6-222230 | | 8/1994 |
| JP | 06222230 A | * | 8/1994 |
| JP | 2003-244295 | | 8/2003 |

OTHER PUBLICATIONS

Sullivan et al. ("Polymeric Waveguides", Circuits and Devices Magazine, IEEE, vol. 8, Issue 1, pp. 27-31, Jan. 1992).*

* cited by examiner

*Primary Examiner*—Michelle Connelly-Cushwa
(74) *Attorney, Agent, or Firm*—Wenderoth, Lind & Ponack, L.L.P.

(57) ABSTRACT

A portable device has a configuration such that a plurality of housings are connected functionally, wherein the thickness of a connection section between the housings is reduced so that the portability is improved. The portable device includes a first housing; a first board provided in the first housing; a second housing; a second board provided in the second housing; a connection section for connecting the first housing with the second housing in such a manner that their relative position can be changed; and an optical waveguide film having at least one optical waveguide for connecting the first board with the second board through optical wiring.

6 Claims, 29 Drawing Sheets

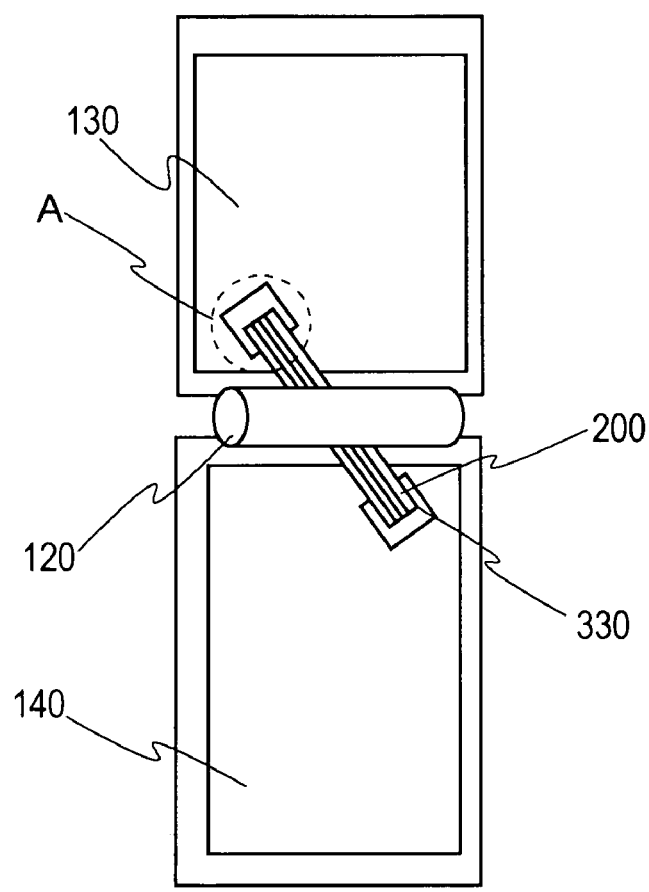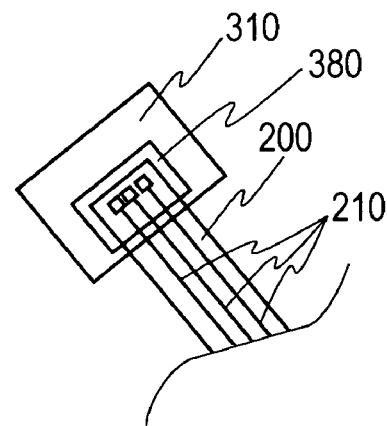
Fig. 12A                    Fig. 12B

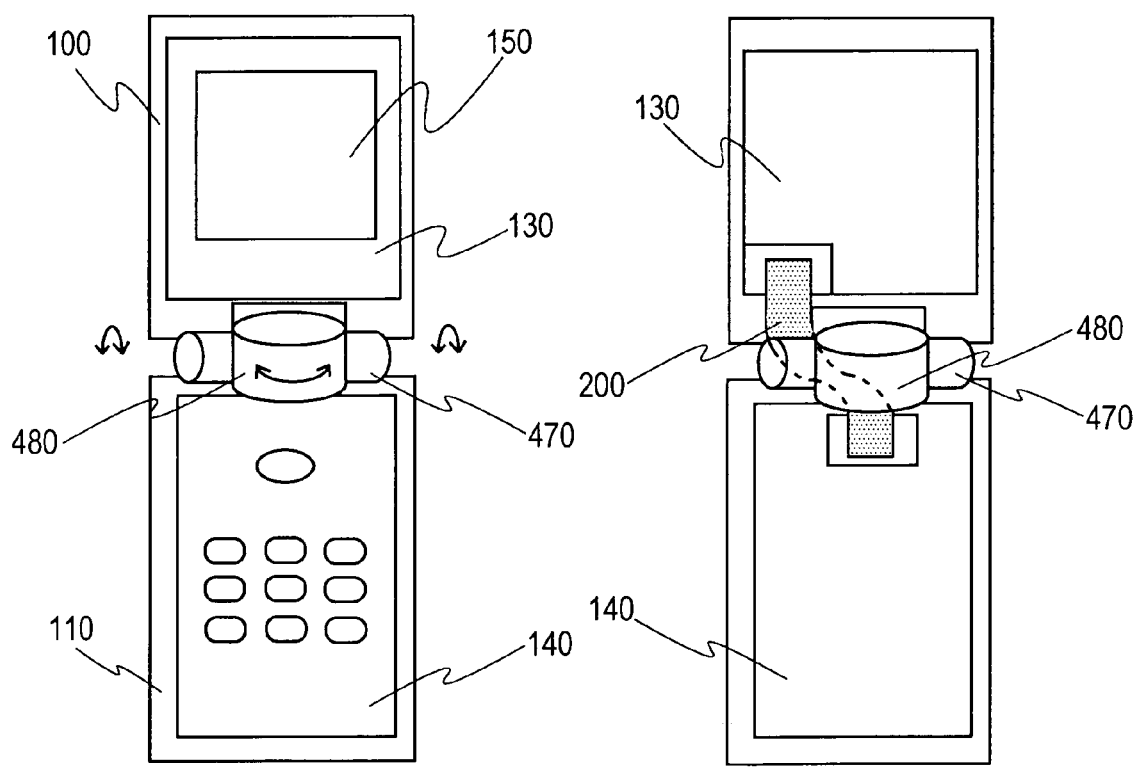

PORTABLE DEVICE

CROSS-REFERENCE TO RELATED APPLICATION

This application is based on Application Nos. 2004-184714 and 2004-070783 filed in Japan, the contents of which are hereby incorporated by reference.

BACKGROUND

1. Technical Field

The present invention relates to a portable device and, in particular, to a portable device such as a portable phone, a PDA (Personal Digital Assistance), and a notebook personal computer, provided with a connection section for connecting a plurality of housings in such a manner that their relative position can be changed.

2. Description of the Background Art

In recent years, in portable devices such as portable phones, PDAs, and notebook personal computers, compact and thin devices are strongly desired for the easiness of carrying. Thus, in portable phones and notebook personal computers, such devices are commonly used that a plurality of housings can be folded up through a hinge portion of a thickness of 10 mm or the like so that portability is improved.

Further, improvements from the perspective of multifunction, high performance, and the like are remarkably seen in these portable devices. As for portable phones, rapidly progressing improvements include: equipping with a camera having an image sensor of over megapixels; employing a high definition and large display; and installing a television function. These improvements cause a significant increase in the required signal transmission speed in the portable devices.

In the configuration of a portable phone used commonly, a body part generally provided with a key operation section and a control section is joined through a fold-up hinge with a cover part provided with a display and a camera. In the prior art, signal transmission between these body part and cover part has been performed by means of electric signals through a few tens or more of coaxial cables.

Here, in spite of the increase in the required signal transmission speed in the devices, the space for the hinge portion tends to decrease in order to satisfy the requirement of thickness reduction. This places a limit to the increase in the number of coaxial cables, and hence has caused a limit to the achievable signal transmission speed. Further, electromagnetic interference in the electric signals occurs between the antenna and the coaxial cables in the hinge portion, and thereby has caused a problem in speech quality and calling reliability.

In order to resolve these problems, the use of optical wiring in signal transmission has been proposed so as to achieve high speed signal transmission and mass data transmission between the body part and the cover part. For example, patent document 1 discloses that optical fibers are used as inter-housing transmission means and thereby achieve high speed transmission and suppress electromagnetic interference.

On the other hand, patent documents 2 and 3 disclose that film-shaped optical waveguides are used in optical wiring so as to interconnect boards. Patent document 2 discloses that a plurality of parallel signals outputted from a printed board are converted directly into a plurality of parallel optical signals, and then transmitted through film-shaped optical waveguides of the same number as the signals.

Patent document 3 discloses that core sections and a clad layer of optical waveguides, as well as metallic wiring, are formed on a polyimide film so that a flexible electro-optical wiring film is produced. Then, electro-optical devices mounted on electro-optical wiring boards are interconnected using the wiring film.

Patent document 1: Japanese Laid-Open Patent Publication No. 2003-244295 (p. 4, FIGS. 1 and 2).

Patent document 2: Japanese Laid-Open Patent Publication No. 01-166629 (pp. 2–3, FIGS. 1 and 2).

Patent document 3: Japanese Laid-Open Patent Publication No. 06-222230 (pp. 3–5, FIGS. 2 and 9).

Nevertheless, in the case of optical fibers disclosed in patent document 1, when the optical fibers are made of glass, the fibers break and become disconnected when their bend radius becomes small. In contrast, when these optical fibers are made of plastics having flexibility, their diameter becomes larger. Thus, when the bend radius in the hinge portion becomes small, light is no longer confined owing to the bending. That is, when the fold-up portion is closed, or in the course of the folding up, high speed transmission is not achieved. This places a notable restriction on the use of the device. In order to reduce this optical loss, when the fibers made of plastics were constructed such as to be bent in a larger bend radius, the device thickness in a folded-up state could increase so as to cause a problem in the portability.

Further, in the disclosures of patent documents 2 and 3, major attention is focused on the point that the flexibility of the film-shaped optical waveguides allows the interconnection of boards arranged at different elevation or position from each other. That is, the film-shaped optical waveguides are not expected to be extremely bent or folded up into a bend radius of as small as 5 mm or even less, as is the case with a portable device. Further, in the disclosures of these two patent documents, film-shaped optical waveguides are formed on a base film. This approach causes an increase in the total thickness of the base film and the film-shaped optical waveguide layer. Thus, when the bend radius becomes small, the optical loss increases.

On the other hand, in a portable device, a power supply such as a battery is arranged in one housing, while its supply voltage is provided to the other housing so that component devices in the other housing are driven. Nevertheless, patent document 1 discloses that the housings are connected through signal lines composed of optical fibers, but does not describe that a supply voltage is provided from a housing to another. Thus, when the signal lines described in patent document 1 are applied to a portable device, metallic wiring needs to be provided in addition to the optical fibers. Thus, as a whole, thickness reduction is not sufficiently achieved in the connection section.

SUMMARY

One of objects of the present invention is to provide an improved portable device.

The other object of the present invention is to provide a portable device having such a configuration that a plurality of housings are connected functionally, wherein the thickness of a connection section between the housings is reduced so that the portability is improved.

These objects are achieved by a portable device comprising: a first housing; a first board provided in the first housing; a second housing; a second board provided in the second housing; a connection section for connecting the first housing with the second housing in such a manner that their relative position can be changed; and an optical waveguide film having at least one optical waveguide for connecting the first board with the second board through optical wiring.

The features, aspects, and effects of this new portable device will be clearly understood from the following detailed description with reference to the accompanying drawings.

BRIEF DESCRIPTION OF THE DRAWINGS

This and other objects and features of this invention will become clear from the following description, taken in conjunction with the preferred embodiments with reference to the accompanied drawings in which:

FIG. 12A is a diagram showing the arrangement relation of array type light receiving and emitting devices and optical waveguides in an optical waveguide film used in a portable device according to Embodiment 2;

FIG. 12B is an enlarged view of section A of FIG. 12A in an optical waveguide film used in a portable device according to Embodiment 2;

FIG. 14A is a general view of a portable device according to a modification of Embodiments 1–3;

FIG. 14B is a conceptual diagram showing the arrangement of an optical waveguide film of a portable device according to a modification of Embodiments 1–3;

DESCRIPTION OF THE PREFERRED EMBODIMENTS

Embodiment 1

Figures 1A, 1B:
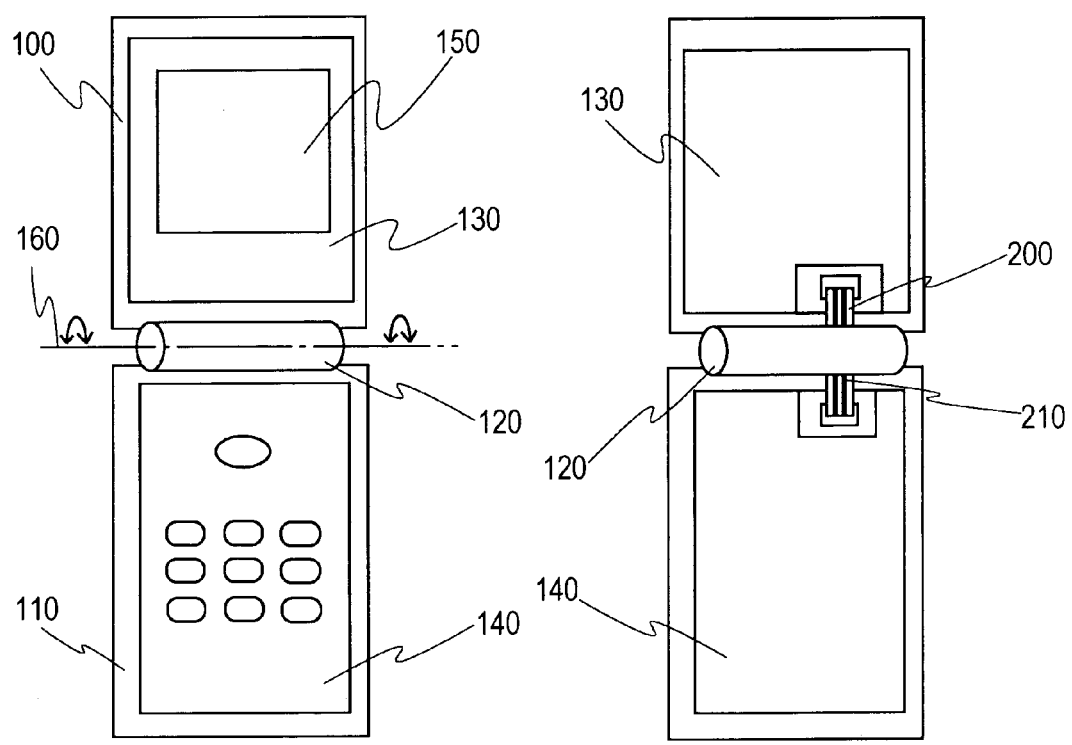
FIG. 1A is a general view of a portable device according to Embodiment 1.
FIG. 1B is a conceptual diagram showing the arrangement of an optical waveguide film of a portable device according to Embodiment 1.

FIG. 1 is a schematic configuration diagram of a portable device according to Embodiment 1. FIG. 1A is a general view of the portable device, while FIG. 1B is a conceptual diagram showing the arrangement of an optical waveguide film in a connection section between a first housing and a second housing. It should be noted that an exterior is provided in practice for covering the connection section. However, in order to clearly show the arrangement of an optical waveguide film, the exterior is omitted in all the drawings including FIG. 1B.

The following description is given using a general portable phone as an example of a portable device. However, its basic structure is common also to portable devices such as a notebook personal computer and a PDA (Personal Digital Assistance) capable of being opened and closed freely.

In FIG. 1A, a first housing 100 and a second housing 110 are connected through a connection section 120 having a hinge capable of being opened and closed freely. The first housing 100 is provided with a first board 130, while the second housing 110 is provided with a second board 140. The first board 130 comprises: a display section 150 composed of an LCD (Liquid Crystal Display) device or an EL (Electro-luminescence) device; a voice section composed of a microphone, a speaker, and the like; a camera section; a control section; a power supplying section; light receiving/emitting devices; and the like. A plurality of such display sections 150, voice sections, camera sections, and the like may be provided on the same surface or both surfaces. The second board 140 comprises a key operation section, a control section, a voice section, a power supplying section, light receiving/emitting devices, and the like.

As shown in FIG. 1B, the first board 130 of the first housing 100 and the second board 140 of the second housing 110 are interconnected by optical wiring through an optical waveguide film 200 having optical waveguides 210 which are arranged approximately at right angles to a connection section 120 and which can transmit optical signals through the connection section 120 without a loss even at a bend radius of 5 mm or the like.

Figure 2A:
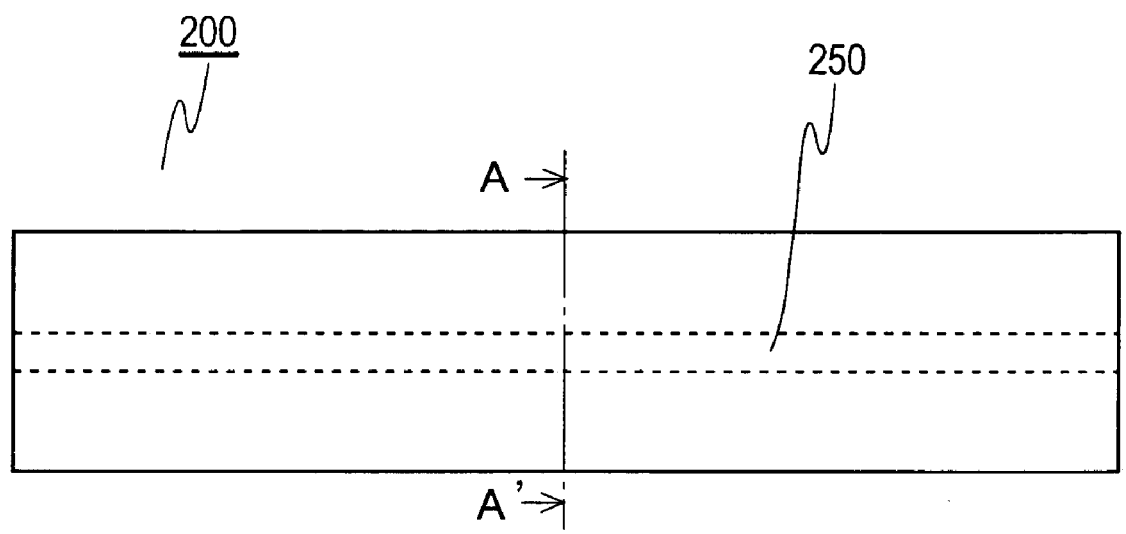
FIG. 2A is a top view of an optical waveguide film used in a portable device according to Embodiment 1.

Described below is the configuration of an optical waveguide film 200 used in an optical wiring of Embodiment 1. FIG. 2 is a configuration diagram of an optical waveguide film 200 used in a portable device of Embodiment 1. FIG. 2A is a top view of the optical waveguide film 200, while FIG. 2B is an A–A' sectional view of FIG. 1A.

Figure 2B:
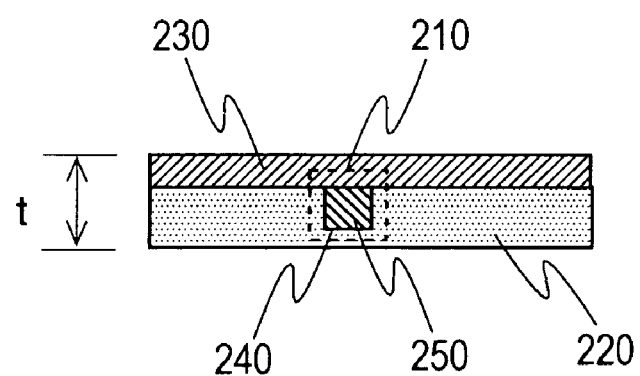
FIG. 2B is an A–A' sectional view of an optical waveguide film used in a portable device according to Embodiment 1.

As shown in FIG. 2B, the optical waveguide film 200 is constructed from: a first clad layer 220 and a second clad layer 230 bonded together; and a core 250 composed of a core material filling a groove 240 formed in the first clad layer 220. Here, an optical waveguide 210 is defined as the core 250 plus a part of the first clad layer 220 and the second clad layer 230 surrounding the core 250. This region is indicated by a dotted line in the figure. Further, the entirety consisting of the core 250, the first clad layer 220, and the second clad layer 230 is referred to as an optical waveguide film 200. These definitions are used throughout the present specification. In Embodiment 1, both of the first clad layer 220 and the second clad layer 230 are composed of cycloolefin polymer which is a thermoplastic resin having a refractive index of approximately 1.5.

Employable cycloolefin polymers include: cycloolefin resin "ZEONEX" available from Zeon Corp.; alicyclic polyolefin resin "ARTON" available from JSR Corp.; and cyclic polyolefin resin "APEL" available from Mitsui Chemicals, Inc. In comparison with acrylic resin and polycarbonate used as optical plastics in the prior art, the above-mentioned resins have good optical properties such as high transparency and low birefringence, as well as low moisture absorption and high heat resistance. Thus, these resins allow the fabrication of an optical waveguide film 200 provided with a reliable optical waveguide 210. The material of the core 250 may be an ultraviolet curing resin of epoxy family or acrylic family or the like.

Described below is a fabrication method for the optical waveguide film 200. However, it should be noted that the fabrication method to be employed for the optical waveguide film 200 is not limited to that described below. First, in order to form a groove 240 serving as a core 250, a mold or the like is produced that has a convex shape formed in the surface. The mold constructing material (die material) may be nickel, silicon, quartz, or the like.

For the purpose of fabrication of an optical waveguide 210 having an extremely low optical loss, the mold employed is preferably produced by electroforming with a metal base material such as nickel. In the case of a mold made of silicon or quartz, the mold can be processed by etching.

Then, a film sheet of cycloolefin polymer serving as the first clad layer 220 is placed on a heater so that the film sheet is heated up to approximately 150° C.–250° C. and thereby softened. Then, the mold made of nickel is pressed against the film sheet so that the convex shape is transferred. As a result, a groove 240 shape corresponding to the core 250 is formed in the surface of the cycloolefin polymer film sheet.

Then, ultraviolet curing resin is applied such as to fill the groove 240 shape so that the core 250 is formed. The refractive index of the core 250 which is important for confining light within the optical waveguide 210 can be changed depending on the material of the ultraviolet curing resin. For example, in a transparent ultraviolet curing resin of epoxy family of optical use, the refractive index can be increased by increasing the content of sulfur or the like. On the contrary, the refractive index can be reduced by increasing the content of fluorine or the like. That is, the refractive index can be adjusted in the range of 1.5–1.7 or the like arbitrarily by changing the composition of the ultraviolet curing resin material. Thus, when a cycloolefin polymer having a refractive index of 1.5 is used for the first clad layer 220 and the second clad layer 230, an optical waveguide film 200 can be obtained that is provided with an optical waveguide 210 where the relative index difference relative to the refractive index of the core 250 can be adjusted in the range of 0% through ten and a few %. When an ultraviolet curing resin having a larger refractive index is used as the core 250 material, the range of achievable relative index difference is extended further.

Then, the second clad layer 230 composed of a film sheet of cycloolefin polymer is bonded to the first clad layer 220 so that the optical waveguide film 200 provided with an optical waveguide 210 is obtained. In this case, before the bonding of the second clad layer 230, ultraviolet curing resin having overflowed from the groove 240 may be removed, when necessary. Further, ultraviolet curing resin may be applied to the bonding surface of the second clad layer 230 so that these clad layers may be bonded together.

The description given above has been made for the case of a fabrication method for an optical waveguide film 200 having one optical waveguide 210. However, an optical waveguide film having a plurality of optical waveguides 210 can be produced similarly. The thickness (t in FIG. 2) of the optical waveguide film 200 is an important factor for reducing the transmission loss in the optical signal caused by bending in an information device such as a portable phone capable of being opened and closed freely. That is, as described below, when the optical waveguide film 200 is bent, the refractive indices of the core 250 and the clad vary owing to a bending stress generated in the film. Thus, their relative index difference also varies. This can cause a leakage of light, that is, an optical loss. Thus, in order to reduce the optical loss caused by the bending stress, it is effective to reduce the thickness of the optical waveguide film 200.

As for the thickness of the optical waveguide film 200 used in a portable device of Embodiment 1, when the core 250 has a square cross section of 50 μm in an example, the thickness of the film sheet of the first clad layer 220 can be approximately 80 μm, while the thickness of the film sheet of the second clad layer 230 can be just over ten μm. Further, the thickness of the optical waveguide film 200 may be reduced by pressing the first clad layer 220 and the second clad layer 230 after bonding them together, to an extent that the core 250 is not extremely deformed. The lower limit of the thickness of the optical waveguide film 200 depends on the size of the core 250. Here, as for the optical signal confined and propagating along the core 250, the light leaks also into the clad portion around the core 250 in practice. Thus, a too thin clad can cause an optical loss. In conclusion, a preferable thickness of the clad around the core 250 is 10 μm or greater. Thus, a preferable thickness of the optical waveguide film 200 is the dimension of the core 250 plus 20 μm or greater, with consideration of the thickness in the vertical direction.

As long as the these conditions are satisfied, the optical waveguide film 200 may be formed in a shape ranging from ultra-thin to thick. Further, the relative index difference of the core and the clad may be selected arbitrarily. Furthermore, depending on the size of the core 250, even a single mode optical waveguide 210 can be produced as well as a multimode optical waveguide.

Figure 3:
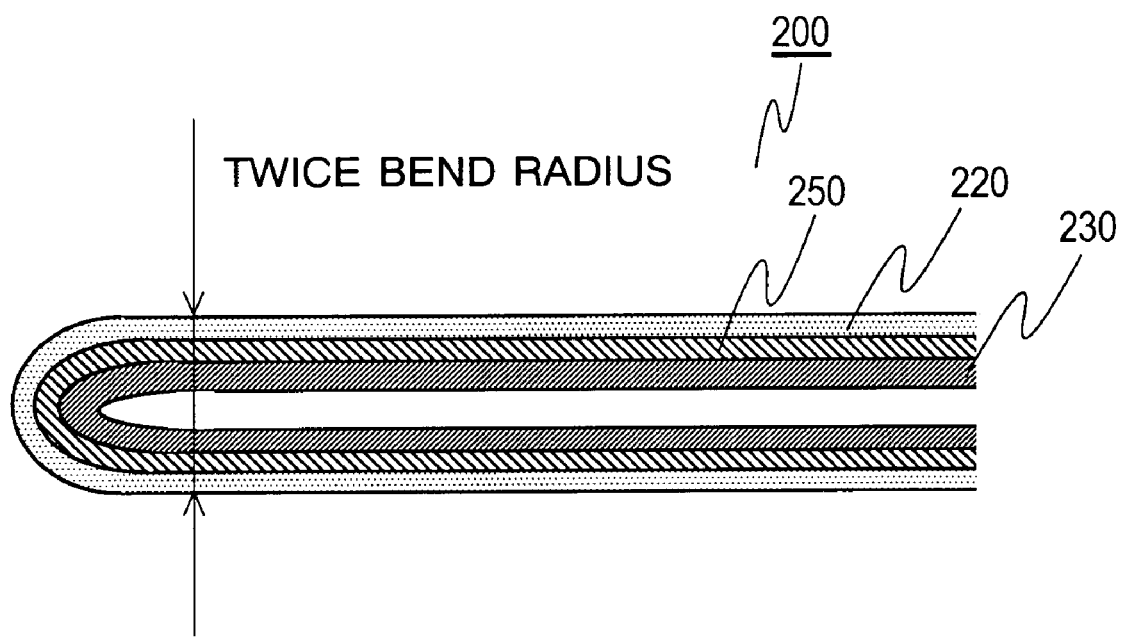
FIG. 3 is a graph showing the relation between a twice bend radius and the optical loss when the thickness is changed in an optical waveguide film used in a portable device according to Embodiment 1.

As described above, how to reduce the optical loss in the optical waveguide film 200 bent in the connection section 120 is important for the thickness reduction of the portable device. Thus, the optical loss caused by bending in the optical waveguide film 200 has been evaluated. The employed evaluation method was as follows. In a state that an optical waveguide film 200 provided with an optical waveguide 210 was bent at 180° as shown in FIG. 3, the measurement was performed by adopting as parameters the thickness of the optical waveguide film 200 and the relative index difference of the core and the clad. Then, the result was evaluated in the form of the relation between twice the bend radius of the optical waveguide film 200 and the relative optical loss in the transmission through the optical waveguide film 200. The definition of twice the bend radius is shown in FIG. 3, and equal to the thickness of the bending portion.

Figure 4:
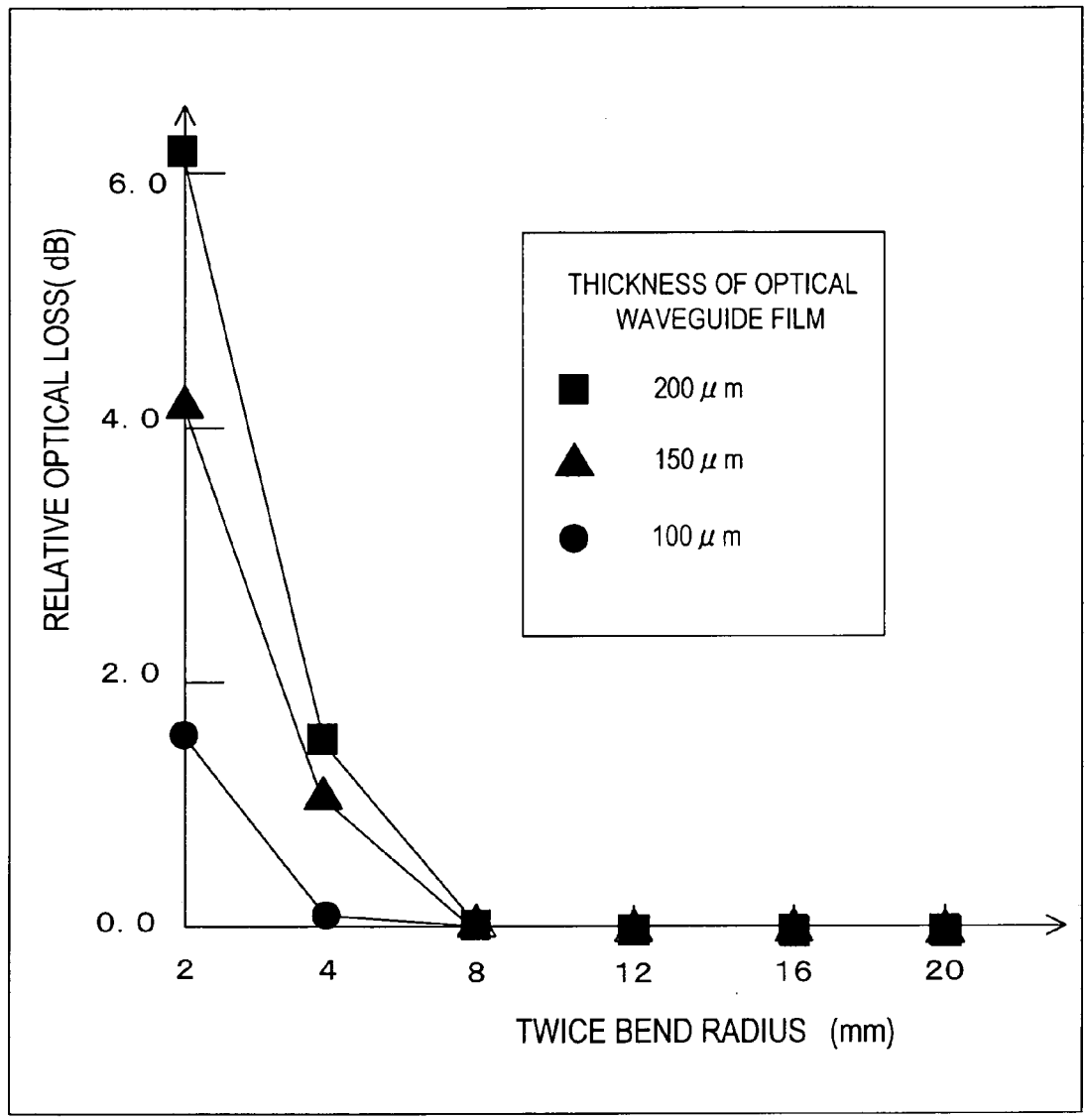
FIG. 4 is a graph showing the relation between the twice bend radius and the optical loss when the thickness is changed in an optical waveguide film used in a portable device according to Embodiment 1.
Figure 5:
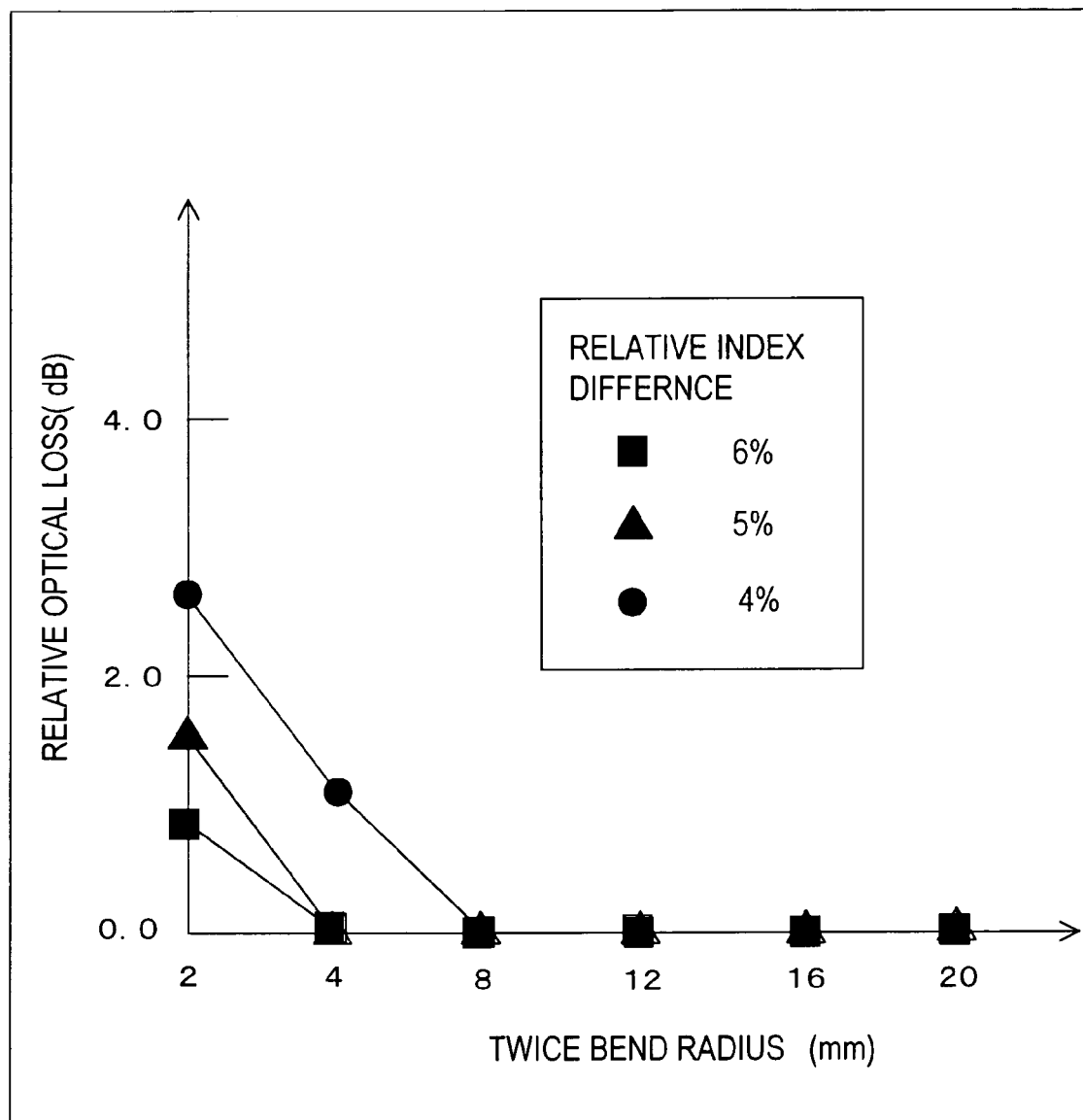
FIG. 5 is a diagram showing the relation between twice the bend radius of a film and the relative optical loss when the relative index difference of the core and the clad of the film is adopted as a parameter in an optical waveguide film used in a portable device according to Embodiment 1.

FIG. 4 shows the relation between twice the bend radius and the relative optical loss for the cases in which the thickness (t) of the optical waveguide film 200 is 100 μm, 150 μm, and 200 μm (the relative index difference is fixed at 5%). FIG. 5 shows the relation between twice the bend radius and the relative optical loss for the cases in which the relative index difference in the optical waveguide film 200 is 4%, 5%, and 6% (the total thickness is fixed at 100 μm). The optical loss mentioned here is expressed as a relative value with reference to a value obtained when the optical waveguide film 200 is not bent.

As seen from FIG. 4, the optical loss caused by the bending increases with increasing thickness of the optical waveguide film 200 even with the same bend radius. Further, as seen from FIG. 5, the optical loss decreases with increasing relative index difference of the core and the clad of the optical waveguide film 200 even with the same bend radius.

In general, the following two mechanisms are expected to cause the optical loss when the optical waveguide film 200 is bent.

1) A loss caused by a change in the refractive indices of the core and the clad caused by material distortion due to a bending stress.

2) A loss caused by a leakage of light from the core depending on the bend radius, which results from the property that light travels straight.

The reason why the optical loss increases with increasing thickness of the optical waveguide film 200 as shown in FIG. 4 is attributed to mechanism 1) listed above. That is, when the bend radius is the same, with increasing thickness of the optical waveguide film 200, an increasing bending stress occurs in the portion where the optical waveguide film 200 is bent. Thus, a photoelastic effect caused by the distortion in the constructing materials results in a change in the refractive indices of the core and the clad so that the relative index difference decreases. This reduces the effect of confining light within the optical waveguide 210.

On the other hand, the reason why the optical loss increases with decreasing relative index difference even with the same bend radius is attributed mainly to mechanism 2) listed above. That is, when the relative index difference is larger, light propagating along the optical waveguide 210 is confined more strongly within the core 250. Thus, even with a small bend radius, light is confined in the core 250 and propagates without an optical loss.

Thus, in the fold-up type portable device of Embodiment 1, for example, the relative index difference of the core and the clad is set to be 5% or greater. Further, the core 250 has a 50-μm square cross section, while the optical waveguide film 200 has a thickness of 100 μm. Then, optical wiring is constructed between the first housing 100 and the second housing 110 via a connection section 120. As a result, signal transmission without an optical loss is achieved even when the folded-up thickness is as small as 8 mm (the bend radius is 4 mm).

The reason why the total thickness of the optical waveguide film 200 can be 100 µm or less is that no base film is necessary in the fabrication of the optical waveguide film 200, and that the optical waveguide film is produced from a thin resin sheet having a thickness of a few tens µm or the like by direct pressing.

This configuration allows thickness reduction in the portable device of Embodiment 1 with respect to the folded-up thickness of the device. Further, optical wiring between the first housing 100 and the second housing 110 is performed through the optical waveguide film 200 provided with the optical waveguide 210. This allows high speed transmission, and provides advantages with respect to multifunction and high performance in the display section, the camera section, and the like. Further, optical wiring avoids electromagnetic noise. That is, signal transmission is not affected by electromagnetic noise. Thus, even when an antenna is arranged in the vicinity of the optical wiring, no problem arises.

Figure 6:
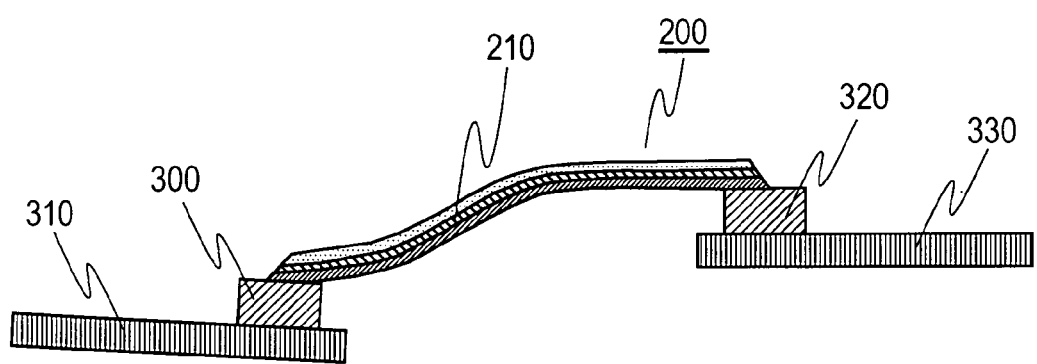
FIG. 6 is a sectional view showing another configuration of an optical waveguide film used in a portable device according to Embodiment 1.

FIG. 6 is a sectional view of another example of an optical waveguide film 200 used in a portable device according to Embodiment 1. This configuration includes: an optical waveguide film 200 according to Embodiment 1; a first sub-board 310 provided with a light receiving device 300; and a second sub-board 330 provided with a light emitting device 320. Here, the light receiving device 300 and the light emitting device 320 are respectively mounted on the first sub-board 310 and the second sub-board 330 by flip chip mounting or wire bonding. The optical waveguide 210 of the optical waveguide film 200 is fixed to the light receiving device 300 and the light emitting device 320 with adhesive which is transparent at least at the wavelength used.

Circuits such as a driver circuit and a signal amplifier circuit associated with the light receiving device 300 or the light emitting device 320 may be provided on the corresponding sub-board or on the corresponding board. As for the board material of the sub-boards and the boards, boards of high frequency use such as glass epoxy boards (FR4) and ceramic boards are preferably used so as to allow high speed transmission at Gbps or higher via the optical waveguide film 200. Then, the driver circuits, the signal amplifier circuits, and the signal processing circuits are mounted on these boards.

Described below is a fabrication method for the another example of an optical waveguide film 200 used in a portable device according to Embodiment 1. First, the light receiving device 300 is mounted on the first sub-board 310, while the light emitting device 320 is mounted on the second sub-board 330.

Then, the optical waveguide film 200 is fixed to the light emitting device 320 and the light receiving device 300 with adhesive which is transparent at least at the wavelength used. According to this method, the optical waveguide film 200 does not undergo a solder reflow process. Thus, low-level heat resistance merely against environmental changes occurring in the normal use of the portable device becomes sufficient. That is, general-purpose thermoplastic materials can be used as the optical waveguide film 200 material. This avoids the necessity of the use of fluorinated polyimide, inorganic and organic hybrid material, and the like which have high heat resistance but are expensive.

FIG. 6 shows the configuration that the light receiving device 300 is mounted on the first sub-board 310, while the light emitting device 320 is mounted on the second sub-board 330. However, at least one or more sets of the light receiving device 300 and the light emitting device 320 may be mounted on each of the first sub-board 310 and the second sub-board 330. In this case, each input and output section of the optical waveguide 210 of the optical waveguide film 200 is converted into a branching structure. Then, input and output are performed by switching the light receiving device 300 and the light emitting device 320.

In this configuration, the optical waveguide 210 of the optical waveguide film 200 is arranged such that an optical signal transmitted from the light emitting device 320 on the first sub-board 310 is led to the light receiving device 300 on the second sub-board 330, while on the contrary, an optical signal transmitted from the light emitting device 320 on the second sub-board 330 is led to the light receiving device 300 on the first sub-board 310. Thus, when the optical waveguide 210 is switched for input and output, two-way communication is achieved.

Alternatively, each of light emitting devices 320 having a different wavelength may be mounted on each of the first sub-board 310 and the second sub-board 330 so that two-way communication may be performed by wavelength multiplexing. This configuration allows two-way communication through a single optical waveguide 210. Further, this configuration reduces the space for optical wiring, and hence is effective in the use in the mounting on a portable device where merely a limited space is allowed.

Figure 7:
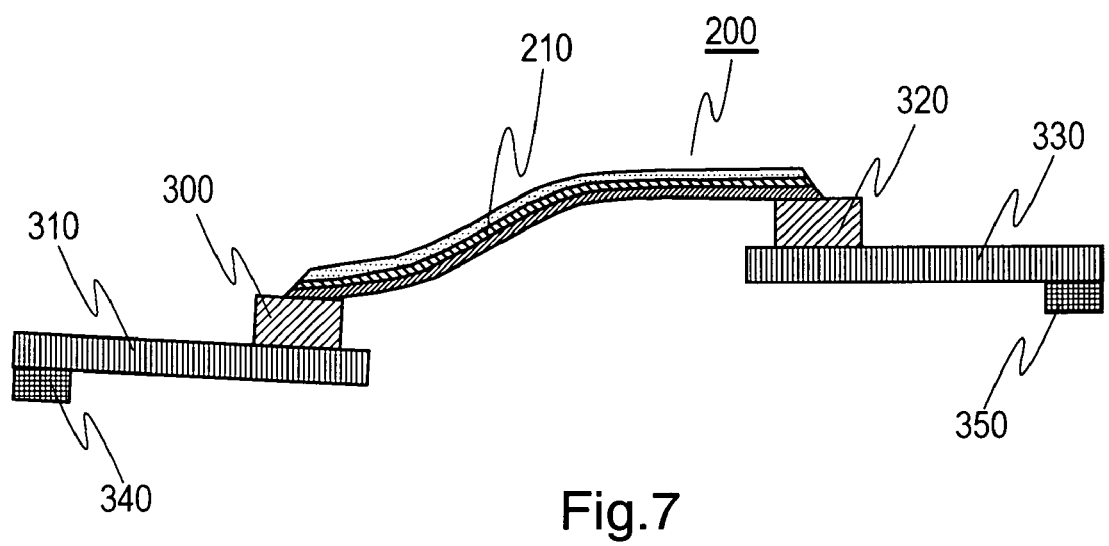
FIG. 7 is a sectional view showing another configuration of an optical waveguide film used in a portable device according to Embodiment 1.

Further, as shown in FIG. 7, the first sub-board 310 and the second sub-board 330 may be provided with electric connectors 340 and 350, respectively. This configuration allows the first sub-board 310 and the second sub-board 330 to be electrically attached and detached freely to and from the first board 130 and the second board 140 respectively via the electric connectors 340 and 350. This improves the convenience in repair work of the portable device. In the configuration of FIG. 7, the electric connectors 340 and 350 are arranged on the back surfaces of the first sub-board 310 and the second sub-board 330. However, the connectors may be provided on the same sides as the light emitting devices 320 and the light receiving devices 300.

Each light receiving device 300 may be composed of a surface receiving type light receiving device, while each light emitting device 320 may be composed of a light emitting device such as a surface emitting type diode or laser. For example, in a surface emitting laser (VCSEL: Vertical Cavity Surface Emitting Laser) which is a surface type light emitting device, low current drive and high speed drive are possible. Further, construction in the form of an array is easy. This allows a few Gbps through a few tens Gbps optical transmission at low power consumption. According to this configuration, necessary accuracy in the alignment with the optical waveguide 210 is alleviated by a factor of ten or the like in comparison with the case of an edge type light emitting device and an edge type light receiving device. This reduces the mounting cost.

Figure 8:
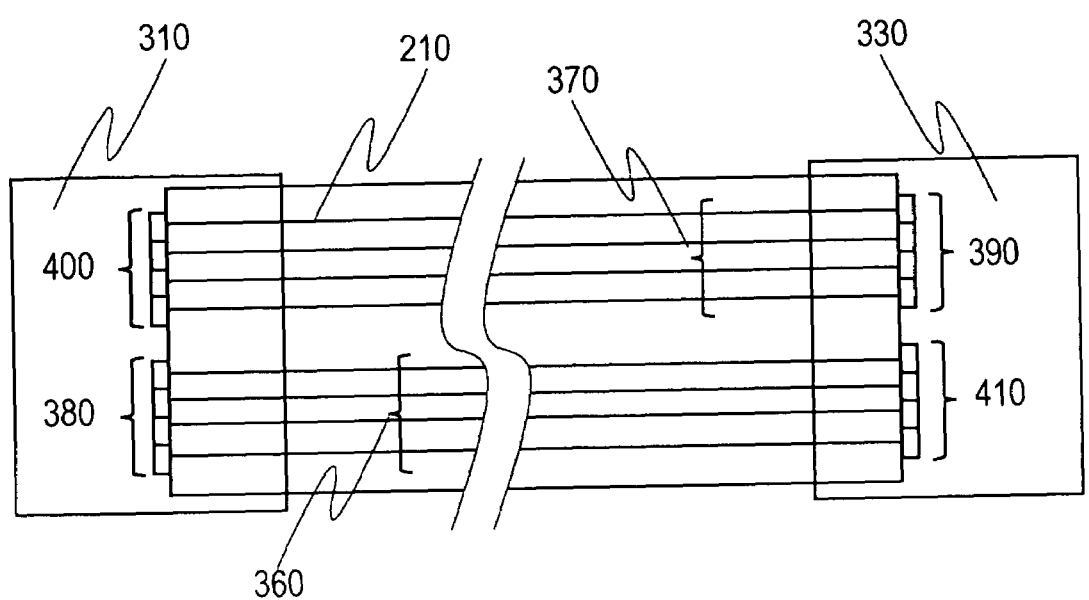
FIG. 8 is a top view of an optical waveguide film having a plurality of optical waveguides used in a portable device according to Embodiment 1.

FIG. 8 is a top view of another example of an optical waveguide film 200 used in a portable device according to Embodiment 1. In this configuration, a first optical waveguide group 360 and a second optical waveguide group 370 each composed of a plurality of optical waveguides 210 are provided on an optical waveguide film 200 according to Embodiment 1. Further, an array type light emitting diode (LED) 380 and an array type photodiode 400 are mounted on the first sub-board 310, while an array type light emitting diode 390 and an array type photodiode 410 are mounted on the second sub-board 330. Then, the first optical waveguide group 360 transmits optical signals outputted from the first sub-board 310 by parallel transmission. The second optical waveguide group 370 transmits optical signals outputted from the second sub-board 330 by parallel transmission.

This configuration allows two-way signal transmission between the first housing 100 and the second housing 110 by parallel transmission. By virtue of this, 1) parallel electric signals can be transmitted merely by being converted into parallel optical signals. That is, parallel-serial conversion is unnecessary. 2) No high speed light receiving device or light emitting device is necessary as the light source. This allows the use of inexpensive chips for the light receiving device and the light emitting device, and hence reduces the cost. 3) By virtue of that the optical signals are confined within the optical waveguides 210, such a portable device is obtained that has outstanding effects such as high optical isolation in two-way transmission.

FIG. 9 is a diagram illustrating another example of an optical waveguide film 200 used in a portable device according to Embodiment 1. In this configuration, positioning markers 420 and a positioning recess 430 are provided in a first clad layer 220 according to Embodiment 1. That is, as shown in the top perspective view of FIG. 9A illustrating the first clad layer 220, positioning markers 420 for mirror 440 formation and a positioning recess 430 for aligning the optical waveguide with a light receiving device or a light emitting device provided with a light emitting device, a light receiving device, or a lens system are formed integrally with the formation of the groove 240 pattern in the first clad layer 220. FIG. 9B shows an A–A' sectional view of FIG. 9A.

Figure 9A:
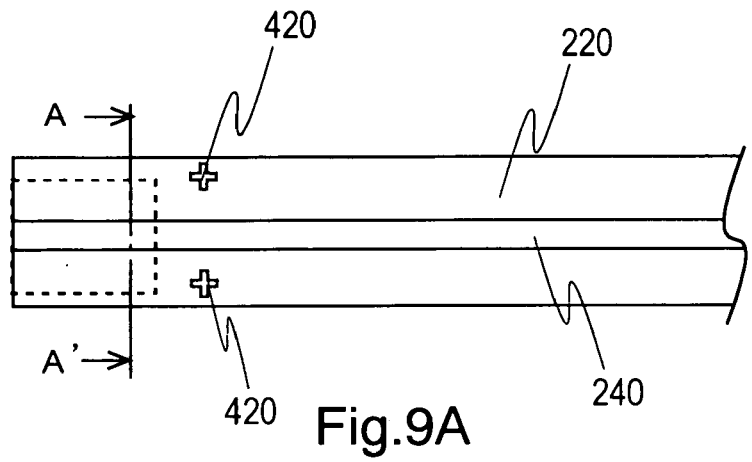
FIG. 9A is a top perspective view of a first clad layer of another example of an optical waveguide film used in a portable device according to Embodiment 1.
Figure 9B:
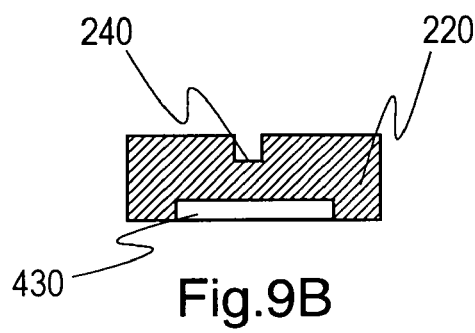
FIG. 9B is an A–A' sectional view of another example of an optical waveguide film used in a portable device according to Embodiment 1.
Figure 9C:
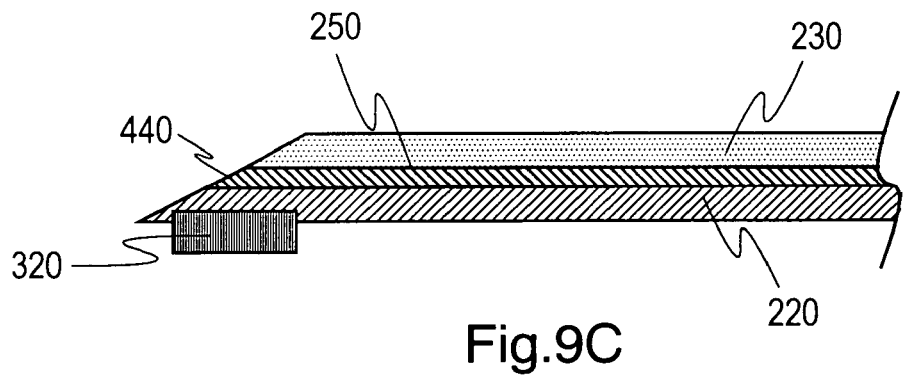
FIG. 9C is a sectional view of an optical waveguide film where a mirror and a light emitting device are arranged using a first clad layer of another example of an optical waveguide film used in a portable device according to Embodiment 1.
Figure 9D:
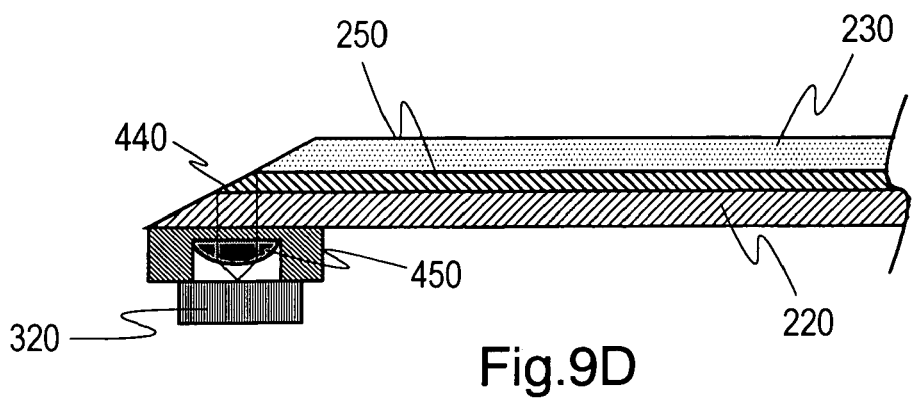
FIG. 9D is a sectional view where a spherical or aspherical lens, a diffraction grating, and the like are arranged between an optical waveguide and a mirror in another example of an optical waveguide film used in a portable device according to Embodiment 1.

FIG. 9C is a sectional view of an optical waveguide film 200 in which a mirror 440 is formed by a blade processing method using the positioning markers 420, while a light emitting device 320 is arranged in the positioning recess 430. FIG. 9D is a sectional view showing the situation in which a spherical or aspherical lens 450, a diffraction grating, and the like are arranged between the optical waveguide and the mirror 440 in the configuration of FIG. 9C.

This simplifies the alignment of the optical waveguide with the mirror 440, the light receiving device 300, and the light emitting device 320, and hence reduces the cost. Further, the lens 450 and the like allow efficient optical coupling of the optical waveguide with the light receiving device 300 and the light emitting device 320, and expand the allowable positional discrepancy.

Embodiment 2

Figures 10A, 10B:
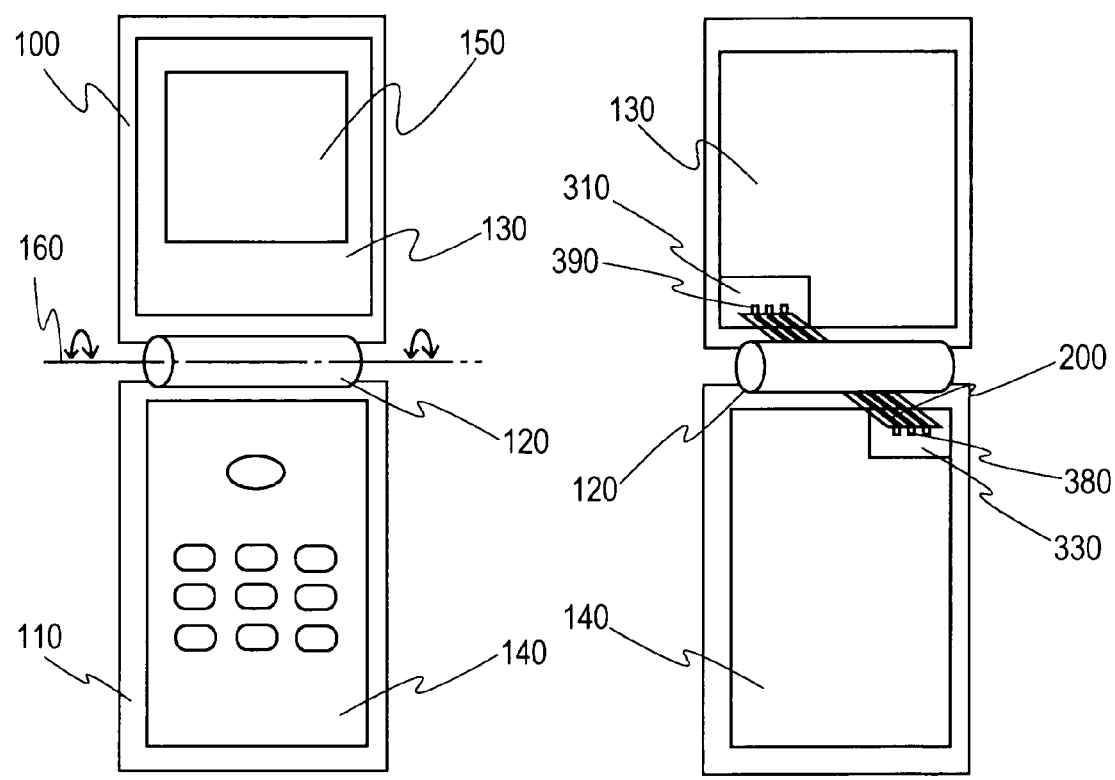
FIG. 10A is a general view of a portable device according to Embodiment 2.
FIG. 10B is a conceptual diagram showing the arrangement of an optical waveguide film used in a portable device according to Embodiment 2.

FIG. 10 is a schematic configuration diagram of a portable device according to Embodiment 2. FIG. 10A is a general view of the portable device. FIG. 10B is a conceptual diagram showing the arrangement of an optical waveguide film 200 in the connection section 120 for optically connecting the first housing 100 with the second housing 110. This configuration is the same as Embodiment 1 except that at least the optical waveguides 210 in the optical waveguide film 200 are arranged obliquely relative to the pivot axis 160 of the connection section 120.

Embodiment 2 achieves further thickness reduction in a portable device according to Embodiment 1. The reason for this is described below. Table 1 shows the relative optical loss generated by bending of the optical waveguide film 200 as a function of the helix angle Φ (see FIG. 11A) between the pivot axis 160 of the connection section 120 and the optical waveguide 210 and using the thickness of the optical waveguide film 200 as a parameter. The relative optical loss mentioned here is expressed as a relative value with reference to the amount of light in a state that the optical waveguide film 200 is not bent, on fixed conditions that twice the bend radius defined in FIG. 3 is 3 mm (the bend radius is 1.5 mm) and that the relative index difference of the core and the clad is 5%.

TABLE 1

| thickness of the optical waveguide film (μm) | helix angle Φ | RELATIVE OPTICAL LOSS (dB) |
| --- | --- | --- |
| 100 | 90° | 0.5–1 |
| 100 | 60° | 0.3–0.8 |
| 100 | 45° | 0 |
| 100 | 30° | 0 |
| 100 | 15° | 0 |
| 150 | 90° | 1.5–2.5 |
| 150 | 60° | 1.2–1.8 |
| 150 | 45° | 0–0.5 |
| 150 | 30° | 0 |
| 150 | 15° | 0 |
| 200 | 90° | 2–4 |
| 200 | 60° | 1.8–2.5 |
| 200 | 45° | 0–0.8 |
| 200 | 30° | 0–0.3 |
| 200 | 15° | 0 |

As seen from Table 1, if the helix angle Φ is 90° which is the case with the first housing 100 and the second housing 110 shown in FIG. 1A, when the thickness of the optical waveguide film 200 is 100 μm and the diameter (twice the bend radius) of the connection section 120 is 3 mm, an optical loss of 1 dB at maximum is generated. Thus, in order that optical signals should be transmitted without an optical loss, the diameter (twice the bend radius) of the connection section 120 needs to be at least 8 mm or the like as shown in FIGS. 4 and 5 of Embodiment 1.

On the other hand, when the helix angle Φ is 45° for example, almost no optical loss occurs even when the diameter (twice the bend radius) of the connection section 120 is as small as 3 mm. This allows further thickness reduction in the portable device. Nevertheless, when the helix angle Φ becomes smaller, the optical waveguide film 200 extending across the connection section 120 and thereby connecting the first housing 100 with the second housing 110 becomes longer. This enhances the width of the portable device, and hence is not practical. For example, in a portable phone, its width is 40 mm or the like. Thus, when the maximum opening and closing angle between the first housing 100 and the second housing 110 is assumed to be 180°, the helix angle Φ is limited to 6.7° or the like.

Figures 11A, 11B:
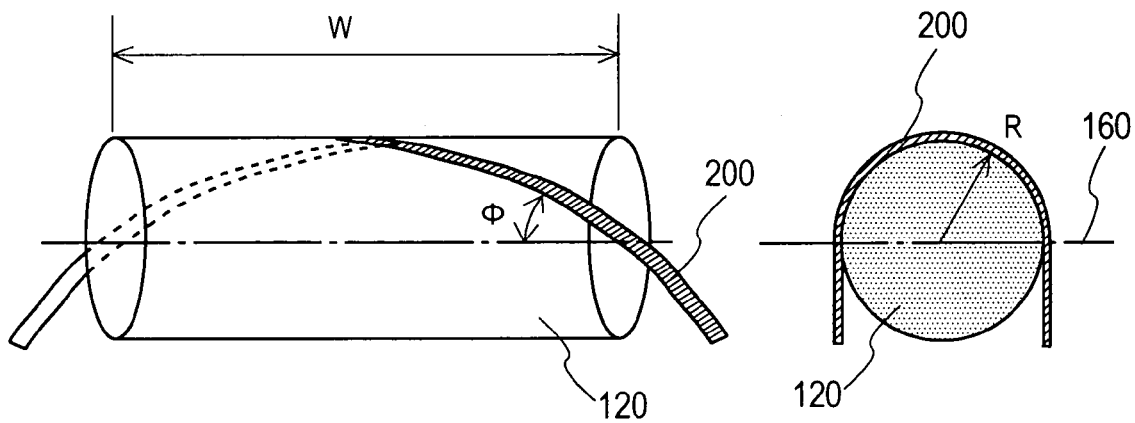
FIG. 11A is a diagram showing an oblique arrangement of a connection section and an optical waveguide film used in a portable device according to Embodiment 2.
FIG. 11B is a diagram of an optical waveguide film used in a portable device according to Embodiment 2, viewed from a pivot direction.

The relation between the width W and the radius R of the connection section 120 of a portable device as well as the practical helix angle F is clarified below. In general, when an optical waveguide film 200 arranged obliquely in a cylinder-shaped connection section 120 is folded up, the optical waveguide film 200 is helically bent at a helix angle F relative to the connection section 120 having a radius R, as shown in FIGS. 11A and 11B. At that time, the optical waveguide film 200 is bent with the minimum angle which is such a helix angle Φ that the width W of the connection section 120 becomes a helix pitch corresponding to a value obtained by dividing the maximum opening and closing angle of the portable device by 360°. For example, when the maximum opening and closing angle is 180°, the width W of the connection section 120 corresponds to 0.5 pitch. In case of 150°, the width corresponds to 0.42 pitch. That is, with a helix angle Φ below these values, the film width exceeds the width W of the connection section 120 so that connection cannot be constructed between the first housing 100 and the second housing 110. Thus, such an angle is not practical. Here, the maximum helix angle Φ is 90° which is the case with Embodiment 1.

In the case of the radius R of the connection section 120, the width W of the connection section 120, and the helix pitch λ=2 πb (2W in the case of 0.5 pitch), appropriate design is performed depending on the shape of the portable device, according to the following Formulas 1 and 2 using the helix angle Φ and the helix length S (corresponding to the minimum optical waveguide length)

$$\tan\Phi = \frac{R}{b} \quad (1)$$

$$S = \frac{W * \sqrt{R^2 + b^2}}{b} \quad (2)$$

For example, when the connection section has a cylindrical shape where the width of the connection section 120 is W=40 mm and the radius of the connection section 120 is R=1.5 mm, and when connection is performed in 0.5 pitch, the obtained results are Φ≈6.7 and S≈40.3 mm. In this case, as seen from the relative optical loss shown in Table 1, optical signals can be transmitted without a loss even when the thickness of the optical waveguide film 200 is 200 μm.

As described above, when the optical waveguide film 200 is arranged oblique relative to the pivot axis 160 of the connection section 120, the radius of the connection section 120 can be further reduced in case that the thickness of the optical waveguide film 200 is thin. This allows further thickness reduction in the portable device. Alternatively, with the radius of the connection section 120 is maintained approximately at a present value (5 mm), a thicker optical waveguide film 200 can be used. This allows low cost fabrication of portable devices suitable for mass production.

In a portable device shown in FIG. 12A where an optical waveguide film 200 is arranged oblique, an array type surface light-emitting device and an array type surface light-receiving device may be arranged in a direction perpendicular to a plurality of optical waveguides 210 of the optical waveguide film 200, as shown in the enlarged view of section A of FIG. 12B. According to this configuration, the device pitch of the array type surface light-emitting device and the array type surface light-receiving device need not be changed depending on the helix angle Φ relative to the pivot axis 160 of the optical waveguide film 200 as shown in FIG. 11. This allows the use of inexpensive chips of an array type surface light-emitting device and an array type surface light-receiving device which are used for connecting with an optical fiber array in the prior art and suitable for mass production. This reduces the cost in the portable device.

Embodiment 3

Figure 13:
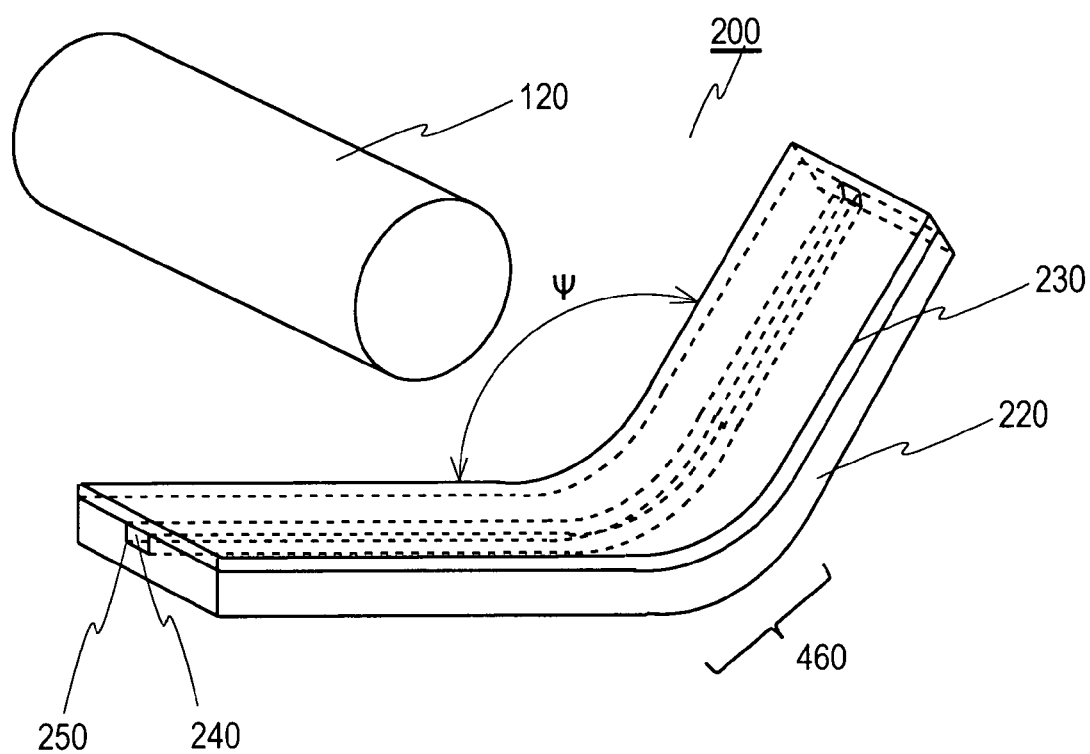
FIG. 13 is a transparent perspective view showing the shape of an optical waveguide film used in a portable device according to Embodiment 3.

FIG. 13 is a transparent perspective view showing the shape of an optical waveguide film used in a portable device according to Embodiment 3. This configuration is the same as Embodiment 1 except that the shape of the optical waveguide film 200 near the opening and closing of the connection section 120 is formed as an already bent shape 460.

Embodiment 3 reduces further the optical loss caused by the bending stress in the optical waveguide film 200 used in a portable device according to Embodiment 1. The reason for this is described below. As described in Embodiment 1, the mechanism of the optical loss caused by bending is that material distortion caused by the bending stress generates a change in the relative index difference of the core and the clad. That is, in the folding operation of the portable device, if the stress in the optical waveguide film 200 is minimum in an opened state, the generated stress reaches the maximum in a folded-up state (corresponding to 180° bending).

Thus, when the optical waveguide film 200 formed in an already bent shape 460 is used in the optical wiring between the first housing 100 and the second housing 110 of the portable device, the maximum bending stress described above is reduced. That is, the stress in the optical waveguide film 200 is minimum in the state of the already bent shape 460 (i.e., when the optical waveguide film 200 has a pre-formed bend 460 such that optical waveguide film 200 is bent while in the resting position). Thus, even when an open and close operation is performed around the bent position, the maximum bending stress described above is not exceeded. For example, in Table 1 of Embodiment 2, in the case of an optical waveguide film 200 having a thickness of 200 μm, when the film is folded up at a helix angle of Φ=45°, a relative optical loss of 0.8 dB at maximum is generated. In contrast, when an optical waveguide film 200 having an already bent shape 460 and an opening and closing angle of Φ=90° produced according to Embodiment 3 is folded up, the relative optical loss is 0 dB. This confirms a sufficient effect in the alleviation of the bending stress.

Here, the already bent shape 460 is not limited specifically. However, a shape in a frequently-used opening and closing position is preferable. For example, in the case of a portable phone, the device is used frequently in a state that the first housing 100 and the second housing 110 are opened. Thus, an already bent shape 460 having an opening and closing angle of Ψ=145°–175° between the first housing 100 and the second housing 110 is preferable. Further, in a notebook PC or a PDA, an already bent shape 460 having an opening and closing angle of Ψ=90°–150° between the first housing 100 and the second housing 110 is preferable.

Described below is a fabrication method for the optical waveguide film 200 having an already bent shape 460. As described in Embodiment 1, a film sheet of cycloolefin polymer serving, for example, as a first clad layer 220 is first placed on a heater so that the film sheet is heated up to approximately 150° C.–250° C. and thereby softened. Then, a mold made of nickel and having a bent shape is pressed against the film sheet so that the convex shape is transferred. As a result, a groove 240 shape corresponding to the core 250 is formed in the surface of the cycloolefin polymer film sheet having an already bent shape 460.

Then, ultraviolet curing resin is applied such as to fill the groove 240 shape so that the core 250 is formed. Then, a second clad layer 230 composed of a film sheet of cycloolefin polymer is bonded to the first clad layer 220 so that an optical waveguide film 200 provided with an optical waveguide 210 and having an already bent shape 460 is obtained.

According to this configuration, the optical waveguide film 200 is formed such as to have a shape in a frequently-used position. Thus, under normal usage conditions, no stress is generated in the optical waveguide film 200. This avoids an optical loss caused by a decrease in the relative index difference of the core and the clad, and hence realizes a portable device capable of performing signal transmission without degradation in the communication quality.

Embodiment 3 may be applied to the optical waveguide film 200 according to Embodiment 2 so that an optical waveguide film 200 having an already bent shape 460 may be arranged oblique relative to the connection section 120 for connecting the first housing 100 with the second housing 110. This configuration reduces the optical loss further, and provides a portable device the thickness of which is reduced further.

In the above-mentioned embodiments, the first housing 100 has been connected with the second housing 110 solely through the optical waveguide film 200. However, in order to transmit a low speed signal, metallic wiring such as an ordinary coaxial cable may be provided in the optical waveguide film 200. Alternatively, another flexible wiring or the like may be used for the connection. According to this configuration, the control circuit, the power supply, and the like provided in the first housing 100 or the second housing 110 can be shared.

Further, in the case of a low speed signal suffering little electromagnetic interference, metallic wiring may be solely used, while in the transmission of a high speed mass data signal such as image information, optical wiring may be performed through the optical waveguide film 200.

In the above-mentioned embodiments, an optical waveguide film having a helical shape may be used as long as no problem arises with respect to the optical transmission distance. Further, an optical waveguide film formed in a shape in the situation that the first housing 100 and the second housing 110 are folded up and an optical waveguide film formed in a shape in the frequently-used bending position may be bonded together. Then, the optical waveguide to be used may be switched depending on the usage position. This alleviates the bending stress generated in the optical waveguide film during the usage, and hence realizes a portable device the optical loss of which is reduced.

Further, as shown in FIG. 14A, the above-mentioned embodiments may be applied to an information device such as a portable phone having a second connection section 480 for allowing the rotation of the first housing 100 or the second housing 110 relative to a first connection section 470 arranged in the opening and closing direction. In this case, for example, as shown in FIG. 14B, the angle at which the optical waveguide film 200 is arranged oblique cannot be small. Thus, a thin optical waveguide film 200 is preferable.

Embodiment 4

Figure 15A:
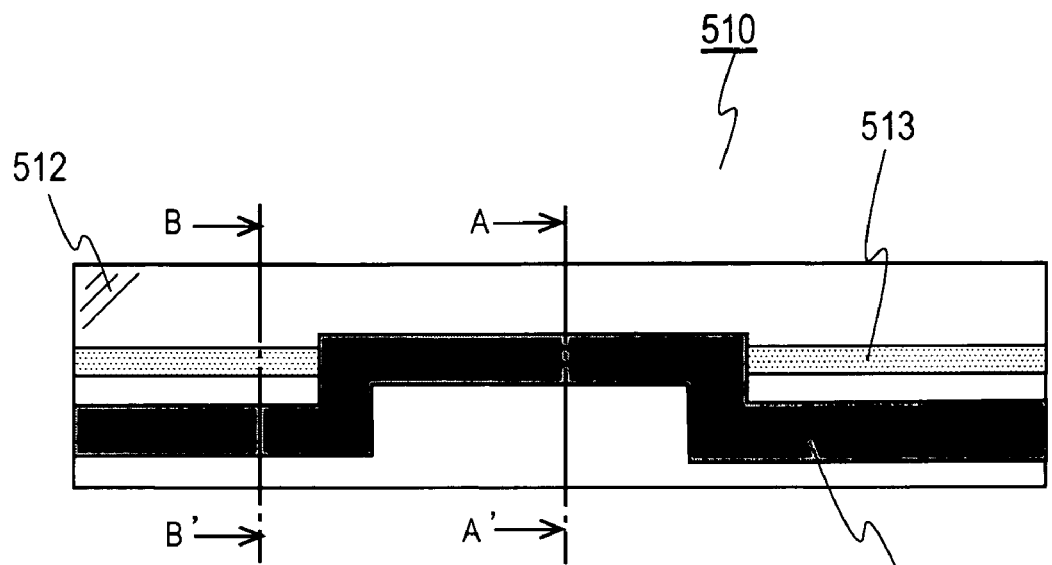
FIG. 15A is a top view of an optical waveguide film used in a portable device according to Embodiment 4.
Figure 15B:
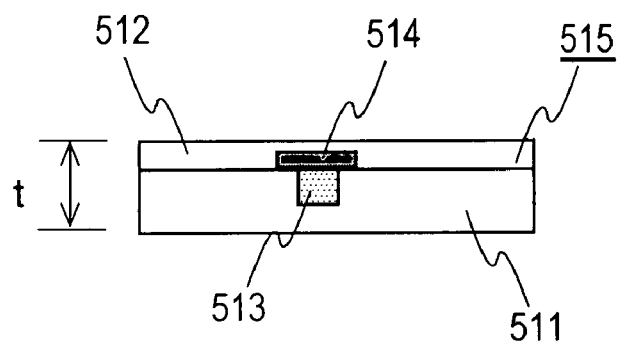
FIG. 15B is an A–A' sectional view of an optical waveguide film used in a portable device according to Embodiment 4.
Figure 15C:
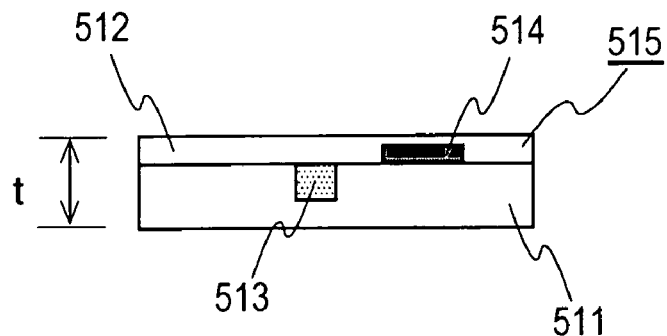
FIG. 15C is a B–B' sectional view of an optical waveguide film used in a portable device according to Embodiment 4.

FIG. 15 is a configuration diagram of an optical waveguide film used in a portable device according to Embodiment 4. FIG. 15A is a top view. FIG. 15B is an A–A' sectional view. FIG. 15C is a B–B' sectional view.

An optical waveguide film 510 comprises a first clad layer 511, a second clad layer 512, a core 513, and a metallic wiring 514. The first clad layer 511 and the second clad layer 512 are bonded together and arranged such as to surround the core 513. As a result, a clad 515 is formed. The first clad layer 511 and the second clad layer 512 are both transparent to the visible light. Thus, FIG. 15A is shown as a transparent view. The core 513 is composed of resin material filling a groove pattern formed in the first clad layer 511. In the second clad layer 512, metallic wiring 514 is formed along the direction that an optical signal is transmitted. The metallic wiring 514 contacts directly with the core 513 in a portion corresponding to the A–A' cross section, but is located distant from the core 513 in a portion corresponding to the B–B' cross section.

The core 513 is composed of ultraviolet curing resin of epoxy family. The first clad layer 511 and the second clad layer 512 are both composed of cycloolefin polymer which is a thermoplastic resin having a refractive index of approximately 1.5. Cycloolefin polymers employable as a thermoplastic resin include: cycloolefin resin "ZEONEX (R)" available from Zeon Corp.; alicyclic polyolefin resin "ARTON (R)" available from JSR Corp.; and cyclic polyolefin resin "APEL (R)" available from Mitsui Chemicals, Inc.

In this configuration, when an optical signal enters from one edge of the core 513, the optical signal is confined within the core 513, and propagates. The optical signal propagates through the inside of the core 513, then reaches the other edge, and exits from the other edge. The optical signal to the core 513 may be provided from a light emitting device such as a semiconductor laser. Alternatively, the optical signal may be provided from a light emitting device located distant from the core 513 via an optical fiber or the like. Further, the optical signal from the core 513 may be led to a light receiving device such as a photodiode. Alternatively, the optical signal may be provided to a light receiving device located distant from the core 513 via an optical fiber and the like. The optical waveguide film 510 may be used as an electric connection line composed of the metallic wiring 514, in addition to the use as an optical connection line for transmitting an optical signal through the core 513. For example, if this optical waveguide film is used in the connection between the housings of a portable information device, when one housing is provided with a power supply, the power is supplied through the metallic wiring even when no power supply is provided in the other housing.

Figure 16:
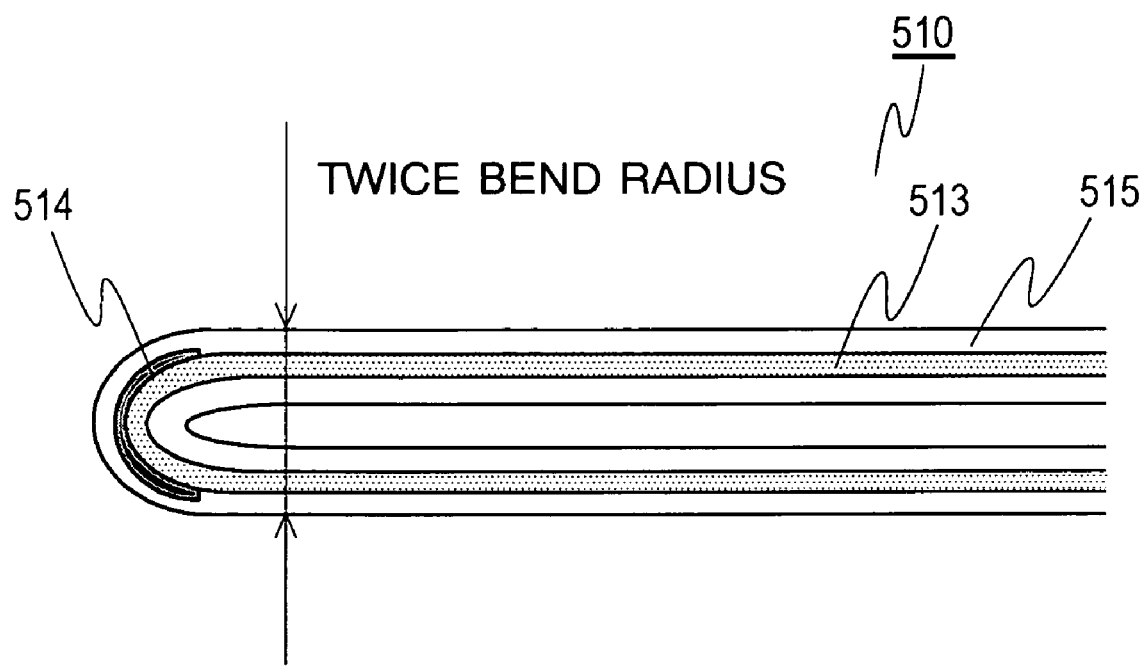
FIG. 16 is a schematic diagram showing the definition of a bend radius formed in an optical waveguide film used in a portable device according to Embodiment 4.
Figure 17:
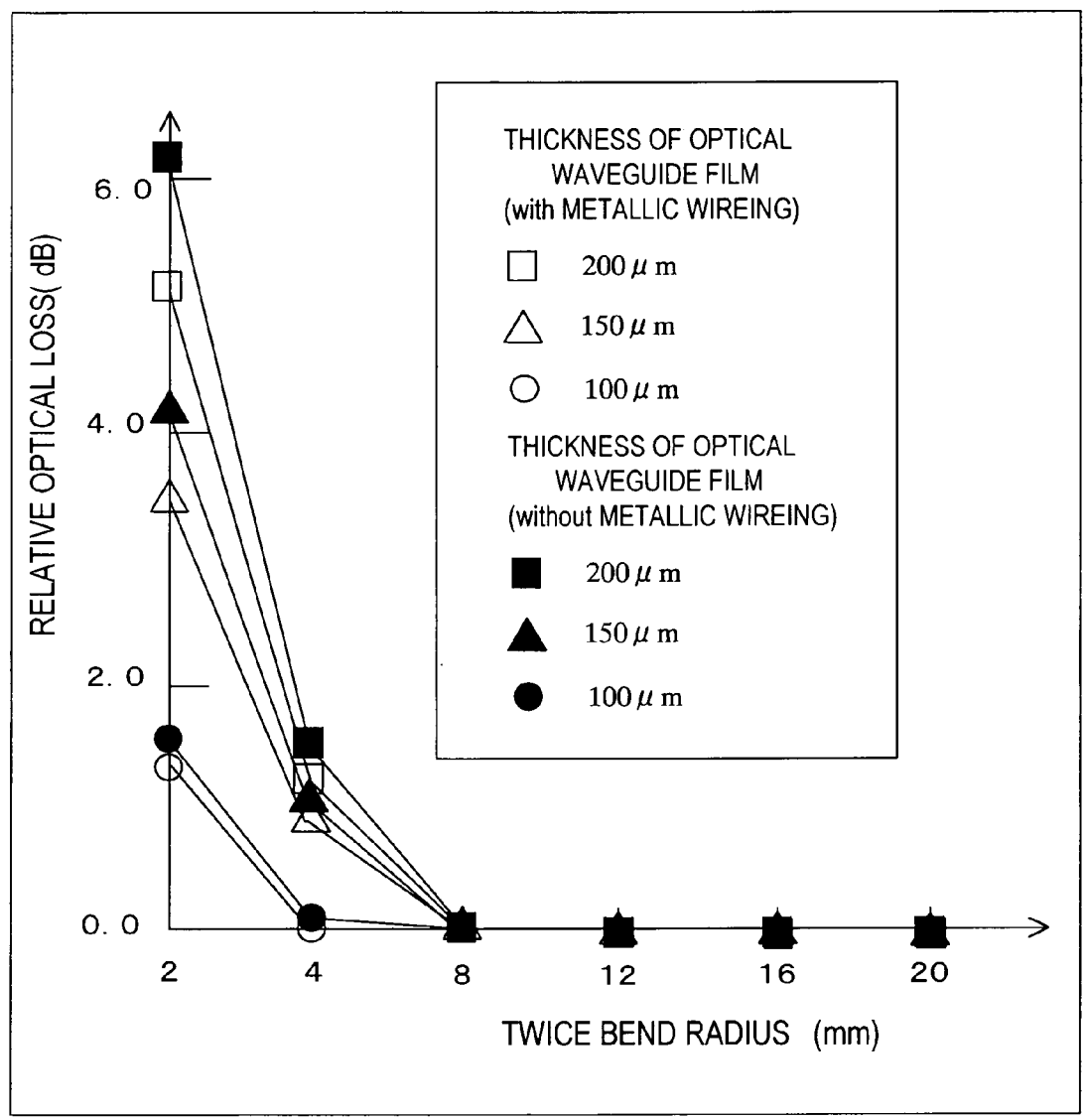
FIG. 17 is a graph showing the relation between the twice bend radius and the optical loss when the thickness is changed in an optical waveguide film used in a portable device according to Embodiment 4.
Figure 18:
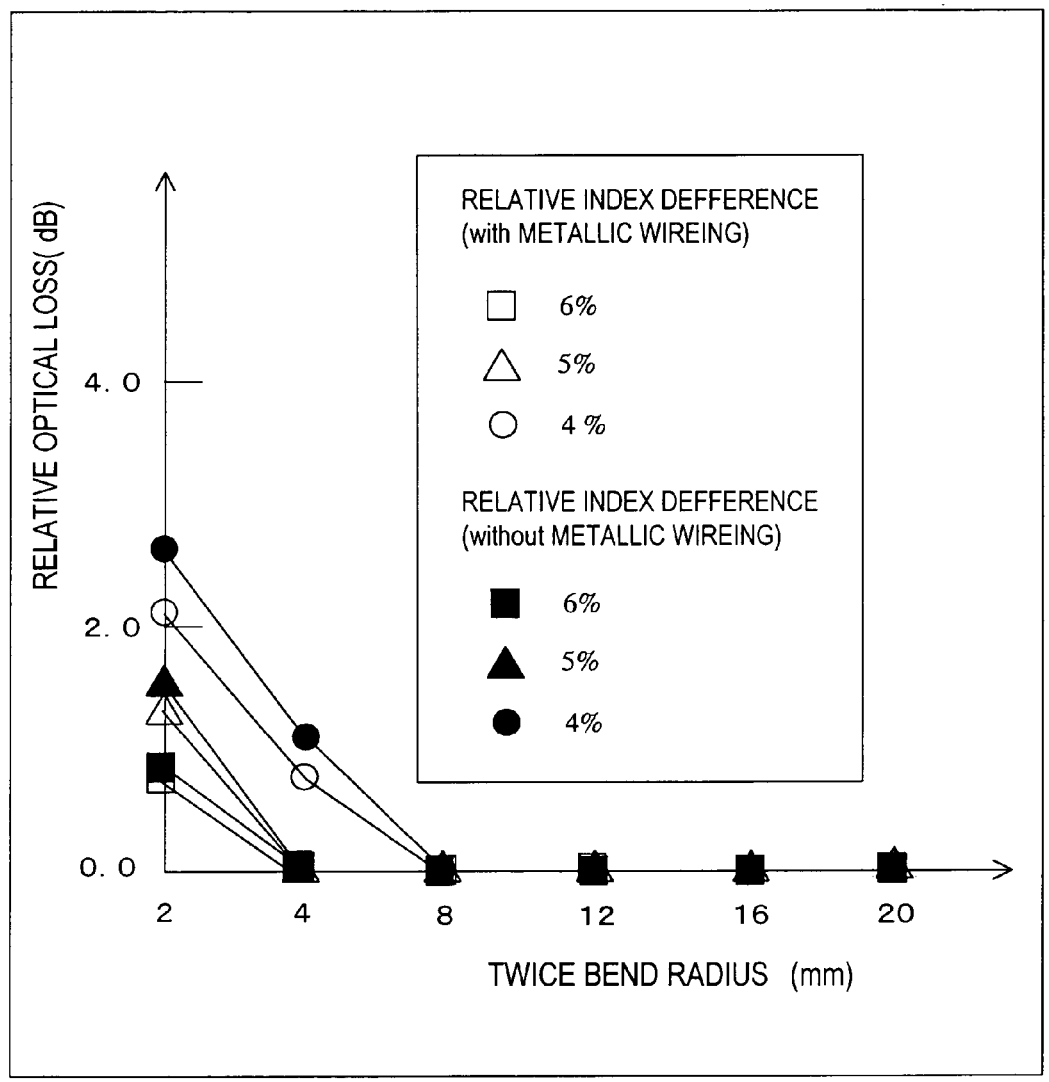
FIG. 18 is a graph showing the relation between the twice bend radius and the optical loss when the relative index difference is changed in an optical waveguide film used in a portable device according to Embodiment 4.

Next, the loss in the optical signal in the case that the optical waveguide film 510 is bent is described below with reference to FIGS. 16–18. FIG. 16 is a schematic diagram showing the definition of a bend radius when the optical waveguide film is bent. In FIG. 16, the optical waveguide film 510 is bent into 180°. The metallic wiring 514 is located in the bending portion. When the optical waveguide film 510 is bent into 180° as shown in FIG. 16, the total thickness of the optical waveguide film 510 in this bent state is defined as twice a bend radius. The measurement result is shown in the graph of FIGS. 17 and 18. FIG. 17 is a graph showing the relation between the twice bend radius and the optical loss for three cases that the thickness of the optical waveguide film 510 is 100 μm, 150 μm, and 200 μm (the relative index difference is fixed at 5%). FIG. 18 is a graph (open symbols) showing the relation between the twice bend radius and the optical loss for three cases that the relative index difference in the optical waveguide film 510 is 4%, 5%, and 6% (the total thickness is fixed at 100 μm). For the purpose of comparison, the relation between the twice bend radius and the optical loss shown in FIGS. 4 and 5 for the case without metallic wiring is superposed on the same graph (closed symbols).

In FIGS. 17 and 18, the vertical axes indicate the optical loss expressed as an increment in the optical loss generated when the optical waveguide film 510 is bent with reference to a value obtained when the optical waveguide film 510 is not bent. As seen from FIG. 17, the optical loss caused by the bending at the same bend radius increases with increasing thickness of the optical waveguide film 510. As seen from FIG. 18, the optical loss at the same bend radius decreases with increasing relative index difference between the core 513 and the clad 515 of the optical waveguide film 510. Further, in all levels in FIGS. 17 and 18, the optical loss is reduced in case that the metallic wiring is provided in comparison with the case that no metallic wiring is provided.

The following two mechanisms are expected to cause the optical loss when the optical waveguide film is bent. (1) An effect (photoelastic effect) caused by a change in the refractive indices of the core and the clad caused by material distortion due to a bending stress. (2) An effect caused by a leakage of light from the core occurring at smaller bend radii, which results from the property that light travels straight. The reason why the optical loss increases with increasing thickness of the optical waveguide film 200 as shown in FIG. 17 is attributed mainly to mechanism (1). That is, when the bend radius is the same, an increasing bending stress occurs with increasing film thickness of the second clad layer 512 and the first clad layer 511. Thus, the photoelastic effect caused by the distortion in the constructing material results in a change in the refractive indices of the core 513 and the clad 515 so that the effect of confining the light is reduced. On the other hand, the reason why the optical loss increases with decreasing relative index difference even at the same bend radius is attributed mainly to mechanism (2). That is, when the relative index difference is larger, light propagating along the optical waveguide 210 is confined more strongly within the core. Thus, even at small bend radii, the light easily propagates. That is, even at small bend radii, the optical signal is transmitted without loss.

In a fold-up type portable information device, a folded-up thickness in the order of 10 mm is desired. At the same time, it is required that signal transmission between the housings can be performed without a problem even in a folded-up state. When the optical waveguide film 510 is mounted on such a personal digital assistance, a preferable value for twice the bend radius is 8 mm or less in order to ensure flexibility. Thus, in the optical waveguide film 510, the thickness needs to be 100 μm or less, while the relative index difference of the core and the clad needs to be 5% or greater.

In the optical waveguide film 510 used in a portable device of Embodiment 4, the achieved values are a thickness of 100 μm or less and a relative index difference between the core and the clad of 5% or greater. The reason for allowing these characteristics is that the optical waveguide film 510 is produced by direct pressing of a thin resin sheet without a base film. The resin material may be any thermoplastic resin such as PMMA, acrylic resin, and polycarbonate. However, cycloolefin polymer which is an inexpensive general-purpose material is preferable because of its low birefringence and high heat resistance. The cycloolefin polymer has good optical properties such as high transparency and low birefringence, in comparison with acrylic resin and polycarbonate which are used as optical plastics in the prior art. Further, the cycloolefin polymer which is a thermoplastic resin has low moisture absorption and high heat resistance, and hence allows the fabrication of a reliable optical waveguide film.

Fluorinated polyimide is proposed as the material for a film-shape optical waveguide in the prior art. However, fluorinated polyimide has a difference (birefringence) in the refractive indices in the thickness and horizontal directions. Thus, both of the core and the clad need to be produced from fluorinated polyimide base material in order that the influence of the birefringence should be reduced. For example, in a prior art optical waveguide film made of fluorinated polyimide, the ratio of monomer is changed so that fluorinated polyimide having a high refractive index to be used in the core and fluorinated polyimide having a low refractive index to be used in the clad are obtained. Nevertheless, both of the core and the clad are of fluorinated polyimide based material, and hence basically the same. Thus, achievable relative index difference is not very large. In conclusion, because of such a limited relative index difference, fluorinated polyimide is not suitable as the material of the clad 515 of the optical waveguide film 510 according to Embodiment 4.

As the material for the core 513, ultraviolet curing resin is most preferable because of the shortness of the process time. However, the material is not limit to epoxy family, and maybe of acrylate family or fluorene family. Further, the material is not limited to ultraviolet curing resin, and may be heat curing resin and room temperature curing resin.

In the optical waveguide film 510 used in a portable device of Embodiment 4, the metallic wiring 514 contacts directly with the core 513 in a portion corresponding to the A–A' cross section. In contrast, the metallic wiring is located distant from the core 513 in a portion corresponding to the B–B' cross section. The metallic wiring 514 is made of metal. Thus, when an optical signal reaches the boundary surface between the core 513 and the metallic wiring 514, a majority of the signal is reflected, while a part leaks to the inside of the metallic wiring 514 so as to cause a loss in the optical signal. In general, the loss is much smaller in the case that the optical signal is confined by means of the relative index difference of the core 513 and the clad 515 than in the case that the optical signal is reflected in the boundary surface between the core 513 and the metallic wiring 514 and then transmitted. However, as described above, when the optical waveguide film 510 is used in a bent state, owing to the above-mentioned effect (2) that the light leaks from the core 513 at small bend radii, the confinement of the optical signal by virtue of the relative index difference of the core 513 and the clad becomes difficult to be achieved in the bending portion. Thus, in the optical waveguide film 510, the optical signal is reflected in the boundary surface between the core 513 and the metallic wiring 514 in the bending portion and then transmitted so that the loss in the optical signal in the portion is reduced. As a result, in the optical waveguide film 510, the metallic wiring 514 prevents the leakage of the optical signal from the core in the vicinity of the A–A' cross section. Thus, the optical waveguide film can be used in a state bent into a sufficiently small bend radius in the vicinity of the A–A' cross section.

An example of a fabrication method for the optical waveguide film 510 is described below. However, the fabrication method for the optical waveguide film is not limited to this.

First, a mold is prepared that has in the surface a convex shape corresponding to the core 513. The mold constructing material may be nickel, silicon, quartz, or the like. For the purpose of fabrication of an optical waveguide film 510 having an extremely low loss, the mold constructing material is preferably a metal such as nickel, while the fabrication method is preferably electroforming. In case that the mold constructing material is silicon or quartz, the fabrication method needs to be etching. Nevertheless, when ultraviolet curing resin is applied by spin coating and then the core is patterned by dry etching, the roughness of the side surface of the core 513 becomes large. Thus, in order to produce a core 513 having a low optical loss, a metal mold composed of nickel or the like and processed by electroforming is preferable. When pressing is performed using such a nickel mold, a very smooth side surface is obtained in the core 513 so that the loss in the transmitted optical signal becomes as extremely low as 0.1 dB/cm or less.

Then, a film sheet of cycloolefin polymer is placed on a heater, so that the film sheet is heated up to approximately 150° C.–230° C. and thereby softened. Then, the mold is pressed against the film sheet so that the mold shape is transferred. As a result, a groove pattern corresponding to the core 513 is formed in the surface of the film sheet so that a first clad layer 511 is obtained. Further, ultraviolet curing resin of epoxy family is applied such as to fill the groove pattern. A film-sheet shaped second clad layer 512 in which metallic wiring 514 is formed in advance is stacked from the top onto the first clad layer 511 in which the ultraviolet curing resin of epoxy family is filling the groove pattern, and then bonded together. After the stacking of the second clad layer 512, ultraviolet rays of a predetermined wavelength are projected to an extent that the resin filling the core 513 becomes hard so that an optical waveguide film is obtained.

When necessary, before the bonding of the second clad layer 512, a step may be added for removing ultraviolet curing resin having overflowed from the groove pattern. Alternatively, ultraviolet curing resin may be applied to the bonding surface of the second clad layer 512. The metallic wiring 514 formed in the second clad layer 512 may be made of gold or copper. An intermediate film may be inserted between the second clad layer 512 and the metallic wiring 514, when necessary.

The refractive index of the core 513 can be changed depending on the material used as the ultraviolet curing resin of epoxy family. For example, the refractive index of a transparent ultraviolet curing resin of epoxy family of optical use can be increased by increasing the content of sulfur or the like. On the contrary, the refractive index of the transparent ultraviolet curing resin of epoxy family of optical use can be reduced by increasing the content of fluorine or the like. As such, the refractive index of the core 513 can be adjusted in the range of 1.5–1.7 by changing the material composition. Thus, when cycloolefin polymer having a refractive index of 1.5 is used for the clad, such an optical waveguide film is obtained in which the relative index difference between the clad and the core is in the range of just over ten % at maximum. Further, ultraviolet curing resin having a high refractive index is also available. Thus, an optical waveguide film having a higher relative index difference can be obtained.

In case that the relative index difference of the core 513 and the clad 515 is large, many modes can occur inside the core 513. Thus, a consideration is necessary that the optical transmission speed difference between these modes can affect the communication. In general, when an optical signal of digital pulses of 10 Gbps or the like is inputted to an optical waveguide film, the time interval of pulses in the optical signal is 0.1 ns. For example, when the optical signal is transmitted through an optical waveguide having a numerical aperture (NA) of 0.4, the mode dispersion after 50-cm transmission is 0.08 ns. In case that the optical waveguide film 510 is mounted in a portable device, a transmission distance of 10 cm or the like is sufficient. Thus, even when the optical waveguide film 510 has such a high relative index difference described above, the adverse effect on the optical signal with respect to the communication is negligible. The present inventors actually produced an optical waveguide film having a length of 10 cm on such conditions, and conducted an experiment for transmitting a 10-Gbps optical signal. As a result, sufficient transmission properties have been confirmed. In the actually produced optical waveguide film 510, no degradation in the transmission performance was observed even in the use in a bent state.

The thickness (corresponding to t in FIG. 15) of the optical waveguide film 510 can be adjusted by changing the before-pressing initial thicknesses of the film sheets serving as the materials for the first clad layer 511 and the second clad layer 512 and by changing the pressing condition.

When the core 513 is formed into a 50-μm square cross section, a film sheet having a thickness of 80 μm or greater is used for the first clad layer 511. When such a film sheet is pressed with a mold, extreme thickness reduction is achieved in the film to which the groove pattern corresponding to the core 513 is transferred. A film sheet having a thickness often and a few μm or greater can be used for the second clad layer 512. Alternatively, the total thickness of the optical waveguide film can be reduced by bonding together the first clad layer 511 and the second clad layer 512 and then pressing them to an extent not to extremely deform the core 513.

The practical lower limit of the thickness of the optical waveguide film 510 depends on the size of the core 513. When light is confined in the core and propagates, the light actually leaks to a clad portion surrounding the core. Thus, when the clad is thin, an optical loss can occur. Thus, a thickness of 10 μm or greater is preferable in the clad surrounding the core 513. Thus, with consideration of the vertical thickness of the core 513 and the clad, a preferable thickness of the optical waveguide film is the size of the core 513 plus 20 μm or greater.

As described above, in the optical waveguide film used in a portable device of Embodiment 4, a part of the metallic wiring contacts with the core so as to prevent the leakage of the optical signal from the core. This function of the metallic wiring avoids the leakage of the optical signal even in the bending portion where the confinement of the optical signal by means of the relative index difference of the core and the clad is difficult. Thus, the optical waveguide film used in a portable device of Embodiment 4 can be bent and used at smaller bend radii.

In the optical waveguide film used in a portable device of Embodiment 4, the relative index difference of the core and the clad is 5% or greater, while the total thickness is 100 μm or less. Thus, the thickness in a bent state is sufficiently small, and the optical signal can be transmitted without a problem.

In the optical waveguide film used in a portable device of Embodiment 4, the clad is composed of cycloolefin polymer. This realizes an optical waveguide film having good optical properties such as high transparency and low birefringence, as well as high reliability with respect to low moisture absorption and high heat resistance. Further, in the optical waveguide film used in a portable device of Embodiment 4, the core is composed of ultraviolet curing resin. This realizes an optical waveguide film having a high relative index difference.

In the optical waveguide film used in a portable device of Embodiment 4, the clad includes: a second clad layer; and a first clad layer provided with a groove pattern having a shape corresponding to the core. The core is composed of resin filling the groove pattern in the first clad layer. This realizes an optical waveguide film having a sufficiently small thickness even in a bent state and capable of being produced at low cost.

The optical waveguide film used in a portable device of Embodiment 4 has a sufficiently large relative index difference, and can be designed in a wide thickness range from thin to thick. Thus, the optical waveguide film can support multimode and single mode.

Embodiment 5

Figure 19A:
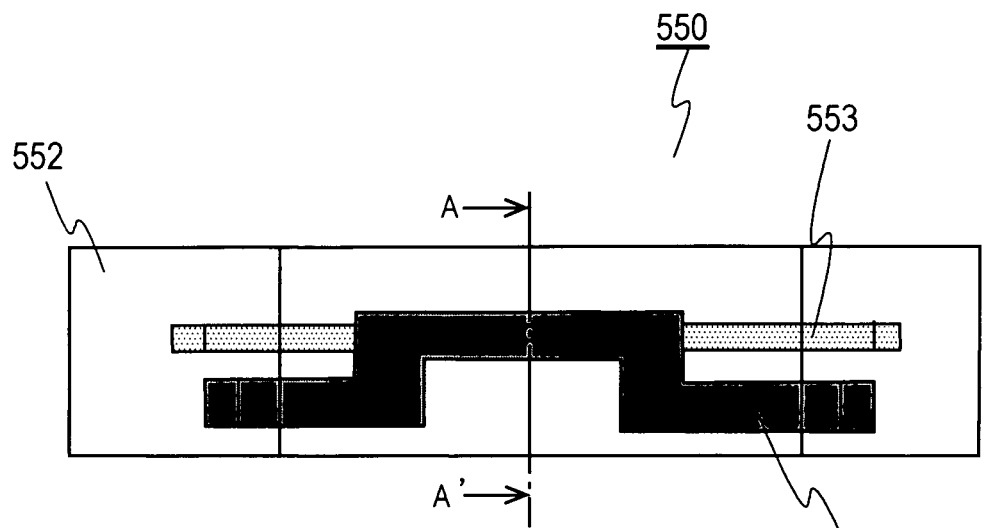
FIG. 19A is a top view of an optical waveguide film used in a portable device according to Embodiment 5.
Figure 19B:
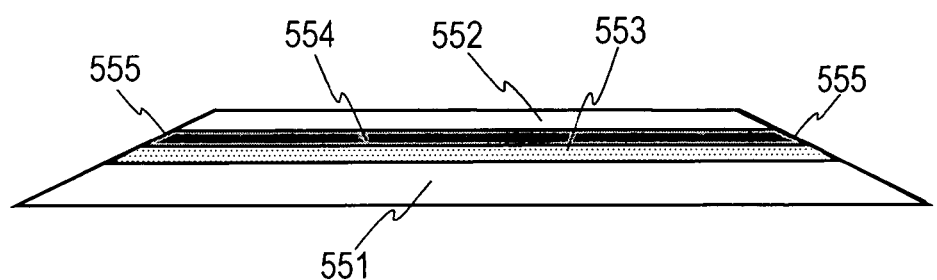
FIG. 19B is a side view of an optical waveguide film used in a portable device according to Embodiment 5.
Figure 19C:
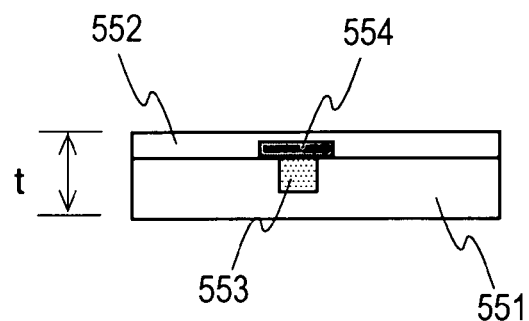
FIG. 19C is an A–A' sectional view of an optical waveguide film used in a portable device according to Embodiment 5.

FIG. 19 is a configuration diagram of an optical waveguide film according to Embodiment 5. FIG. 19A is a top view. FIG. 19B is a side view. FIG. 19C is an A–A' sectional view. The optical waveguide film 550 has almost the same configuration as the optical waveguide film 510 used in a portable device of Embodiment 4. The general configuration of a core 553, a first clad layer 551, a second clad layer 552, and metallic wiring 554 is the same. The difference is that both ends are cut oblique. In the core 553 of the optical waveguide film 550, a mirror 555 is formed in the portion cut oblique at each end. An optical signal having entered into the core 553 is bent in the mirror 555 by 90° from a direction perpendicular to the propagating direction into the propagating direction. Further, the optical path of the optical signal having been transmitted through the inside of the core 553 is bent by 90° in the mirror 555. In conformity with the two mirrors 555, the ends of the first clad layer 551, the second clad layer 552, and metallic wiring 554 are cut oblique.

As such, in the optical waveguide film 550, an optical signal enters from a direction perpendicular to the transmission direction of the optical signal, and then reflected by the mirror 555 so that the optical signal is coupled to the core 553. Further, in the optical waveguide film 550, the optical signal transmitted through the inside of the core 553 is reflected by the mirror 555 so that the optical signal exits from the core 553. This configuration allows the use of a surface emitting type device as a light emitting device and of a surface receiving type device as a light receiving device. These surface emitting type device and surface receiving type device have a wide allowance of alignment, and hence are easy to be mounted. This realizes an optical waveguide film produced easily.

The optical waveguide film 550 can be produced as follows. That is, in the fabrication method for the optical waveguide film 510 described in Embodiment 4, the mirrors 555 are formed at the same time that the first clad layer 511 is formed with a mold. In this fabrication method, after the core 553 is produced by molding, the first clad layer 551, the second clad layer 552, and the metallic wiring 554 are cut such that each end forms a plane. In another fabrication method, after an optical waveguide film 510 according to Embodiment 4 described above is produced, a V-shaped blade having a 90° cross section is used to cut each end so as to produce a 45° mirror. In the optical waveguide film 550, the mirror 555 adopts total reflection. However, a metal film composed of gold or the like may be coated.

Figure 20:
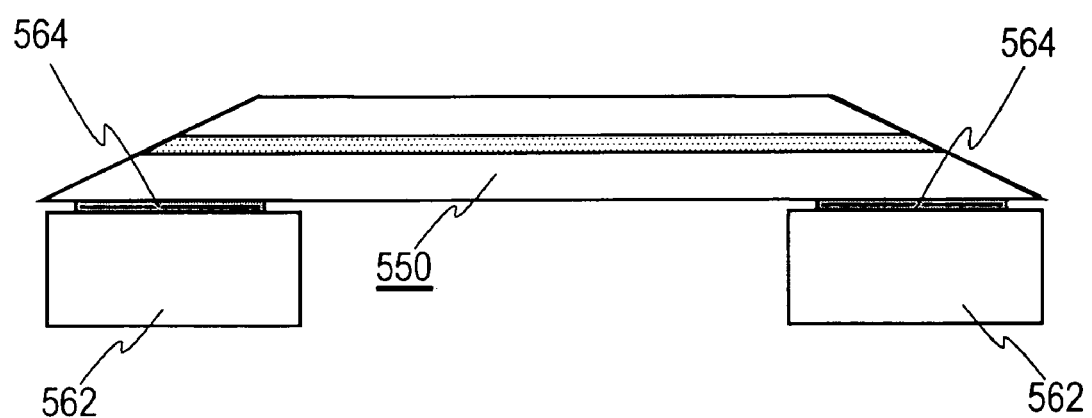
FIG. 20 is a side view showing a state that a surface light-emitting device and a surface light-receiving device are mounted on an optical waveguide film used in a portable device according to Embodiment 5.

FIG. 20 is a side view showing a state that a surface light-emitting device and a surface light-receiving device are mounted on the optical waveguide film 550 according to Embodiment 5. A surface light-emitting device 562 is fixed in a position corresponding to a mirror 555 at one end of the optical waveguide film 550. A surface light-receiving device 563 is fixed in a position corresponding to a mirror 555 at the other end of the optical waveguide film 550. The use of the optical waveguide film 550 simplifies the connection with the surface light-emitting device 562 and the surface light-receiving device 563. When the surface light-emitting device 562 and the surface light-receiving device 563 are mounted on the optical waveguide film 550, adhesive 564 which is optically transparent to the optical signal is applied to the optical waveguide film 550 or alternatively to the surface light-emitting device 562 and the surface light-receiving device 563. After that, these components are combined and fixed together. The employed adhesive may be ultraviolet curing resin.

Figure 21:
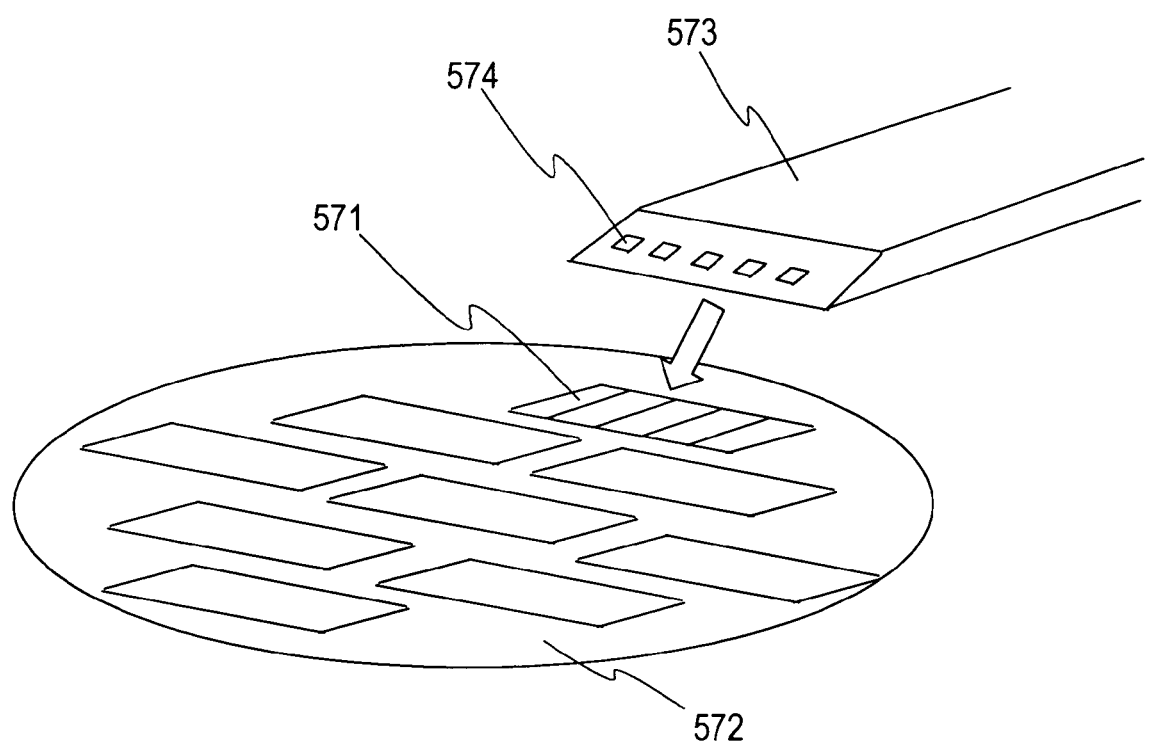
FIG. 21 is a perspective view showing a situation that a light emitting diode array is adhered to an optical waveguide film used in a portable device according to a first modification of Embodiment 5.

FIG. 21 is a perspective view showing a situation that a light emitting diode array is adhered to the optical waveguide film according to a modification of Embodiment 5. In FIG. 21, an optical waveguide film 573 has almost the same configuration as the optical waveguide film 550 described in Embodiment 5. The difference is that a plurality of cores 574 are formed in a mutually independent manner in the inside of the clad. Each core 574 of the optical waveguide film 573 has a mirror in each end. A plurality of light emitting diode (LED) arrays 571 are formed with predetermined spacing on a wafer 572. At that time, when the number and spacing of the light emission points on the light emitting diode array 571 are set approximately equal to the number and spacing of the cores 574, the optical signals emitted from a plurality of the light emission points of the light emitting diode array 571 are coupled to the cores 574. Such an optical waveguide film is obtained after the cores 574 and the LED points are aligned, and then adhered and fixed together.

In the surface light-emitting device and the surface light-receiving device described with reference to FIGS. 20 and 21, necessary adjustment accuracy in the alignment with the optical waveguides is alleviated by a factor of ten or the like in comparison with the case of an edge emitting device and an end face light receiving device. This simplifies the adjustment in the mounting of the surface light-emitting device and the surface light-receiving device onto the optical waveguide film, and hence reduces the mounting cost. Further, in a surface emitting laser (VCSEL) which is a surface emitting type device, low current drive and high speed drive are possible. Furthermore, construction in the form of an array is easy. Thus, the use of a VCSEL allows a few Gbps through a few tens Gbps optical transmission at low power consumption. Even when the light emitting diode array 571 described with reference to FIG. 21 is replaced with a VCSEL array, its mounting can be performed by the same method.

The optical waveguide film 550 is effective especially when a VCSEL is used as the light source. The VCSEL has a property that the beam divergence angle increases with increasing optical output. Nevertheless, when fluorinated polyimide described above is adopted as the material of the optical waveguide film, the relative index difference of the core and the clad cannot be very large. Thus, the total reflection condition in the optical waveguide film becomes more severe. Accordingly, in a prior art optical waveguide film composed of fluorinated polyimide, a numerical aperture (NA) of 0.2–0.3 or the like has merely been achievable. Thus, even when the optical output of the VCSEL is increased, an optical signal portion entering into the optical waveguide film at a large angle relative to the propagating direction cannot be accepted so that the coupling loss between the VCSEL and the core increases with increasing optical output of the VCSEL. In contrast, in the optical waveguide film 550 of Embodiment 5, a very large refractive index difference of the core and the clad is achievable. Thus, even when the optical output of the VCSEL is increased, the coupling loss between the VCSEL and the optical waveguide is almost constant. The present inventors produced an optical waveguide film 550 according to Embodiment 5, and conducted an experiment for coupling an optical signal from a VCSEL to the optical waveguide film. As a result, it has been confirmed that even when the optical output of the VCSEL is increased, the coupling loss between the VCSEL and the optical waveguide is constant.

As such, in the optical waveguide film of Embodiment 5, the core has at each end a reflective surface for bending the optical path of the optical signal by approximately 90°. Thus, when this configuration is formed on the light source side, a surface light-emitting device can be used as the light source. Further, when the configuration is formed on the light-receiving side, a surface light-receiving device can be used as a photo-receiving section. As a result, in the fabrication of an optical waveguide film, in particular, the adjustment in the mounting of light receiving and emitting devices becomes easy so that the cost is reduced.

When a VCSEL is used as the light source, achieved are low current drive and high speed drive which are advantages of the VCSEL. Thus, the optical waveguide film of Embodiment 5 becomes especially effective.

Embodiment 6

Figure 22A:
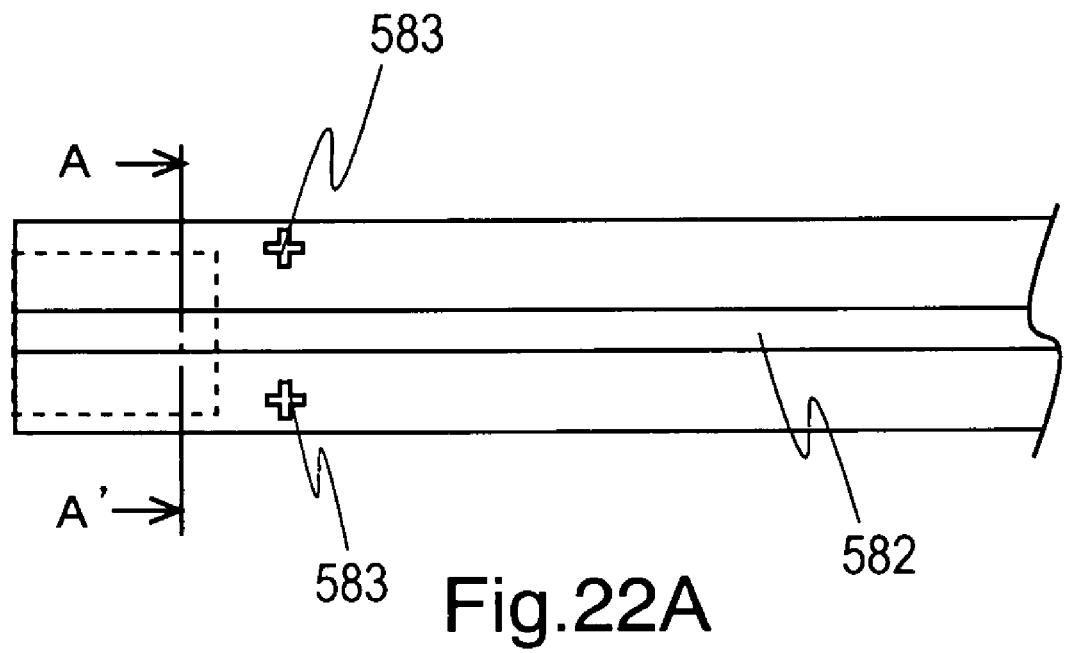
FIG. 22A is a top view of a principal part in an intermediate stage of a fabrication process of a first clad layer of an optical waveguide film used in a portable device according to Embodiment 6.
Figure 22B:
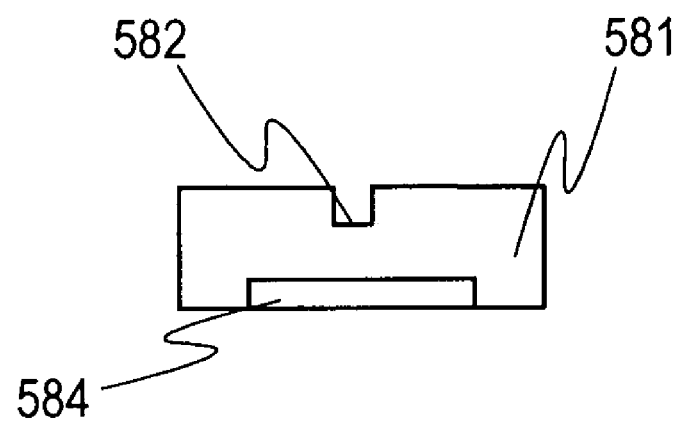
FIG. 22B is an A–A' sectional view of a first clad layer of an optical waveguide film used in a portable device according to Embodiment 6.

FIG. 22A is a top view of a principal part in an intermediate stage of a fabrication process of a first clad layer of an optical waveguide film according to Embodiment 6. FIG. 22B is an A–A' sectional view of a first clad layer of an optical waveguide film according to Embodiment 6. A first clad layer 581 of an optical waveguide film 580 according to Embodiment 6 has almost the same configuration as the first clad layer 551 of Embodiment 5. The difference is that cut processing markers 583 are formed in the surface of the first clad layer 581 where a groove pattern 582 is formed, and that a positioning marker 584 is formed in the back surface opposite to the surface where the groove pattern 582 is formed.

The cut processing markers 583 are cross-shaped recesses. The cut processing markers 583 are formed by transferring a convex shape formed in a mold in advance, when the groove pattern corresponding to the core is formed. The cut processing markers 583 serve as a reference for determining the position for a blade when the optical waveguide film 580 is cut oblique so that a mirror is produced at each end of the core. The positioning marker 584 is a recess having a predetermined depth. The positioning marker 584 is formed also by transferring a convex shape formed in the mold in advance, when the groove pattern corresponding to the core is formed. The positioning marker 584 serves as a positioning reference in the mounting of a surface light-emitting device or a surface light-receiving device on the optical waveguide film. Thus, the positioning marker 584 is formed in conformity with the shape of the entrance or exit side of the surface light-emitting device or the surface light-receiving device to be mounted.

The cut processing markers 583 and the positioning marker 584 are formed simultaneously when the groove pattern 582 corresponding to the core is formed in the first clad layer 581. Thus, the cut processing markers 583 and the positioning marker 584 are produced in a state without a relative positional discrepancy with the groove pattern 582. Thus, the first clad layer 581 is produced easily with precision. Further, after the bonding of the second clad layer, the mirror is formed with reference to the cut processing markers 583 by blade processing. Thus, the positioning of the core and the clad with the mirror and the light receiving and emitting devices is achieved easily with precision. This reduces notably the mounting cost in the fabrication of the optical waveguide film 580.

The cut processing markers 583 may be replaced with a marker serving as a reference for ensuring that the optical waveguide film should be cut into a predetermined transmission length. Alternatively, a marker may be employed that serves as a reference for determining the position where the filling of resin should start in the fabrication of the core. As such, any marker may be employed as long as the marker serves as a reference for post processing. Further, the positioning marker 584 may be replaced with a marker serving as a reference for the alignment of the optical fiber for inputting and outputting the optical signal. Alternatively, a marker may be employed that serves as a reference for determining the position of the board to be connected to the optical waveguide film. Further, an appropriate combination of these markers may be used.

As such, in the optical waveguide film of Embodiment 6, the first clad layer has markers serving as positional references for a device to be connected and/or for post processing. This simplifies post processing as well as assembling and testing. Thus, in the optical waveguide film of Embodiment 6, the mounting cost is reduced.

Embodiment 7

Figure 23:
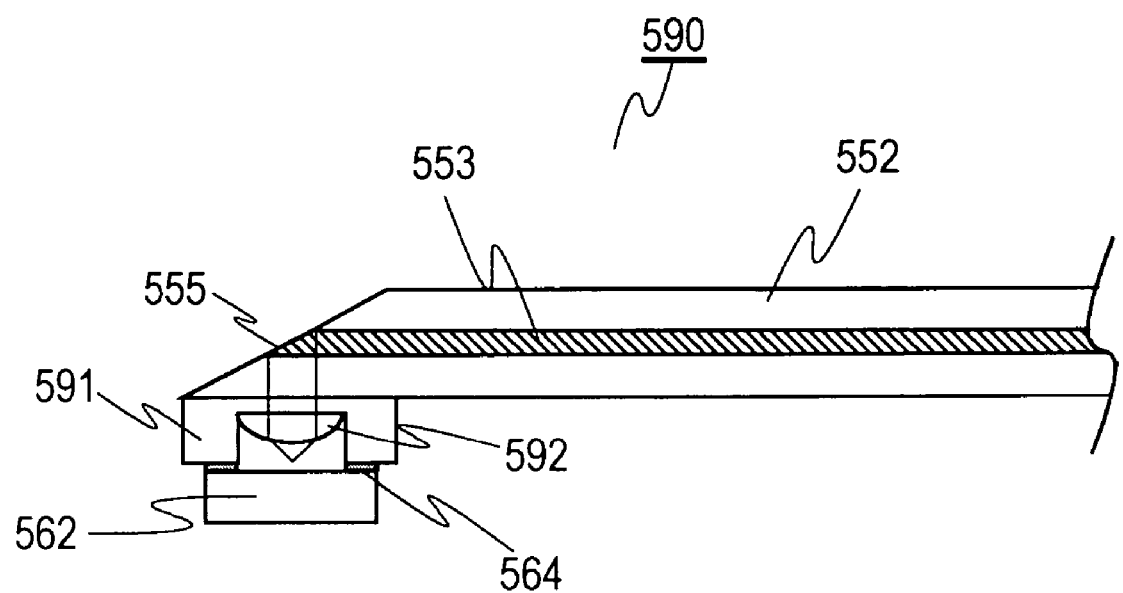
FIG. 23 is a sectional view of an optical waveguide film used in a portable device according to Embodiment 7.

FIG. 23 is a sectional view of an optical waveguide film according to Embodiment 7. An optical waveguide film 590 according to Embodiment 7 has almost the same configuration as the optical waveguide film 550 of Embodiment 5. The difference is that a lens element 592 is arranged between the optical waveguide film 590 and a surface light-emitting device 562.

In the optical waveguide film 590, an optical signal emitted from the surface light-emitting device 562 is converged by the lens element 592, and then enters into the optical waveguide film 590 as an approximately parallel beam. The optical path of the entered optical signal is bent by 90° in the mirror 555, and then transmitted through the inside of the core 553. The lens element 592 is fixed to the first clad layer 551 via a holder section 591. The holder section 591 may be produced integrally by increasing the thickness of a part of the first clad layer 551, or alternatively may be produced as a separate component. However, the integral fabrication is preferable from the perspective of ease in the adjustment and reduction of fabrication processes. When the optical waveguide film has a plurality of cores 553 for example, the lens elements 592 are produced in the same number as the number of cores. The lens element 592 is opposing the surface light-emitting device 562 with a predetermined distance therebetween. The surface light-emitting device 593 is fixed through adhesive 564 which is transparent at the wavelength used. The portion where the lens element 592 is arranged is an end. Thus, this structure does not affect the bending of the optical waveguide film 590.

When the lens element 592 is arranged between the surface light-emitting device 562 and the core 553 as in Embodiment 7, the optical signal is led to the core 553 with a high coupling efficiency. Further, when the lens element 592 is inserted, the positional discrepancy allowance between the surface light-emitting device 562 and the mirror 555 is alleviated. Furthermore, when the lens element 592 and the holder section 591 are produced by simultaneous pressing at the same time that the groove pattern is formed in the first clad layer 551, mass production is achieved easily.

In Embodiment 7, the lens element 592 has been illustrated as a lens element having a spherical or aspherical shape. However, the present invention is not limited to this. For example, a diffraction grating or a Fresnel lens having a focusing function may be employed. The present embodiment has been described for the case of an optical waveguide film and a surface light-emitting device. However, the same effect is obtained even when a lens is provided on the surface light-receiving device side.

Embodiment 8

Figure 24:
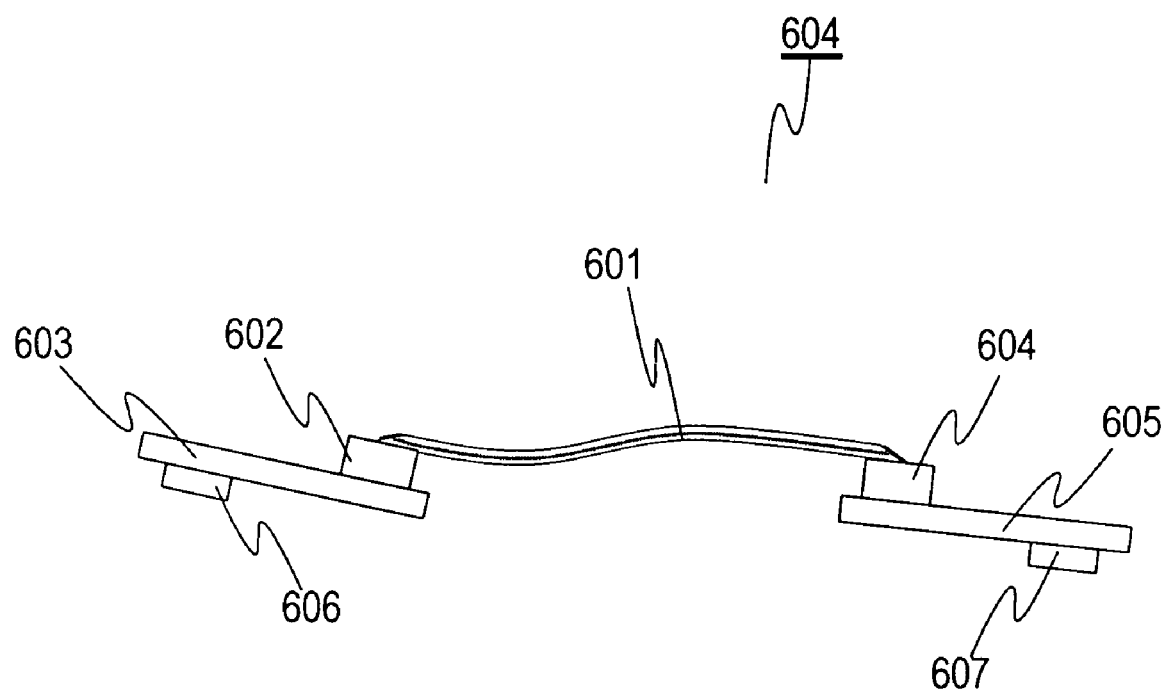
FIG. 24 is a side view of an optical waveguide module used in a portable device according to Embodiment 8.

FIG. 24 is a side view of an optical waveguide module according to Embodiment 8. An optical waveguide module 600 of Embodiment 8 includes an optical waveguide film 601, a first sub-board 603, and a second sub-board 605. The optical waveguide film 601 has the same configuration as the optical waveguide film 550 described with reference to FIGS. 19 and 20, and provided with a surface light-emitting device 602 and a surface light-receiving device 104 thereon. The first sub-board 603 is provided with a predetermined device including the light emitting device 602. The first sub-board 603 has an electric connector 606. The second sub-board 605 is provided with a predetermined device including the light receiving device 604. The second sub-board 605 has an electric connector 607. The first sub-board 603 is electrically connected to the second sub-board 605 through metallic wiring provided in the optical waveguide film 601. The metallic wiring is used for providing a voltage from a power supply. The surface light-emitting device 602 and the surface light-receiving device 604 are mounted respectively on the sub-boards by flip chip mounting or wire bonding. As described above, the surface light-emitting device 602 and the surface light-receiving device 604 are fixed respectively to both ends of the optical waveguide film 601 with adhesive which is transparent at the wavelength used.

Figure 25:
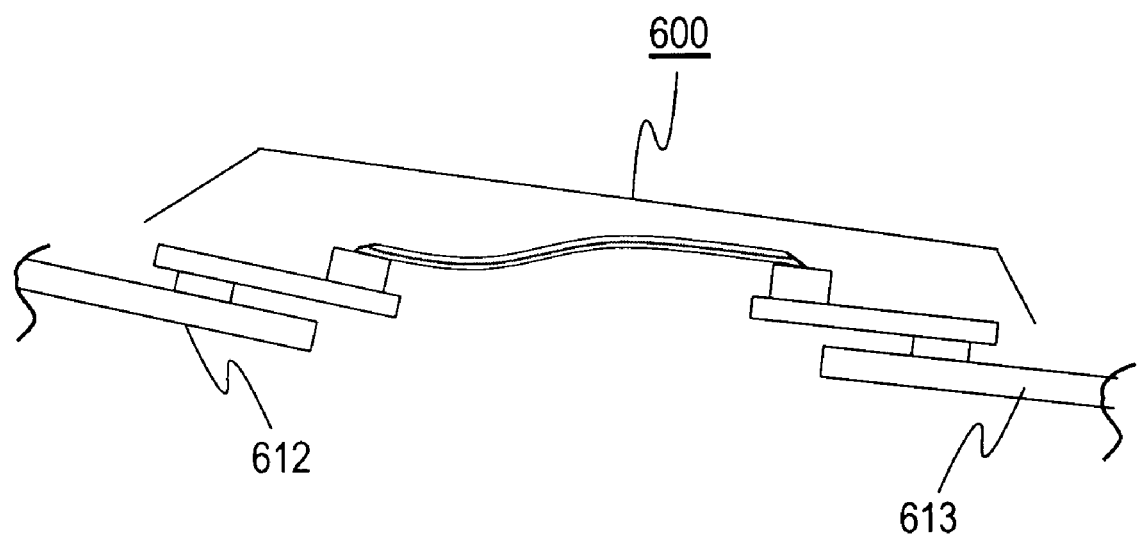
FIG. 25 is a side view showing a usage mode of an optical waveguide module used in a portable device according to Embodiment 8.

FIG. 25 is a side view showing a usage mode of an optical waveguide module according to Embodiment 8. In FIG. 25, an optical waveguide module 600 interconnects two main boards 612 and 613. The optical waveguide module 600 is attached to each main board through an electric connector provided in each sub-board. The main board 612 and the main board 613 are interconnected via the sub-boards by an optical signal transmitted through the core of the optical waveguide film included in the optical waveguide module 600. Further, the main boards 612 and 613 are electrically interconnected via the sub-boards by metallic wiring included in the optical waveguide module 600. That is, the optical waveguide module 600 connects the first sub-board 603 with the second sub-board 605 in two independent manners, that is, in an optical manner with an optical signal transmitted through the optical waveguide film and in an electrical manner through the metallic wiring.

The optical waveguide module 600 includes an optical waveguide film 601 having the same configuration as the optical waveguide film 550 described in Embodiment 5. Thus, even in the use in a bent state, a part of the metallic wiring contacts with the core so as to prevent the leakage of the optical signal from the core. This function of the metallic wiring avoids the leakage of the optical signal even in the bending portion where the confinement of the optical signal by means of the relative index difference of the core and the clad is difficult. Thus, the optical waveguide module 600 can be bent and used at smaller bend radii.

Further, the use of the optical waveguide module 600 avoids the necessity of providing optical couplings on the main board 612 and the main board 613. Thus, the main board 612 and the main board 613 can be produced from the same material and by the same process as those of a prior art printed board. Thus, no restriction arises with respect to the circuit wiring, which could arise when a mixture of optical and electric devices is necessary on the same board. That is, in the present embodiment, the main board 612 and the main board 613 need merely to include electrical circuits and power supply lines associated with the light receiving and emitting devices. The circuits such as driver circuits and signal amplifier circuits associated with the light receiving and emitting devices may be provided in either the sub-boards or the main boards. However, in the case of high speed transmission at Gbps or higher, from the perspective of wiring length reduction, the sub-boards are preferably composed of boards of high frequency use made of glass epoxy, ceramic, or the like. Then, the driver circuits, the signal amplifier circuits, and the signal processing circuits for the light receiving and emitting devices are mounted preferably on the sub-boards.

The optical waveguide module 600 has electric connectors. However, the sub-boards may be mounted directly on the main boards without using the electric connectors. However, the electric connectors allow the sub-boards and the main boards to be attached and detached freely, and hence improves the convenience. In the optical waveguide module 600, the electric connectors 606 and 607 are arranged on the back surfaces of the sub-boards. However, these connectors may be arranged on the same side as the light receiving and emitting devices. When the electric connectors are arranged on the back surfaces which are the opposite sides of the light receiving and emitting devices, via holes going through from the front surface to the back surface are preferably provided for establishing electrical connection with the electric connectors.

A preferable fabrication method for the optical waveguide module 600 is such that a light emitting device, a light receiving device, and electric connectors are mounted on the corresponding sub-boards, and then the optical waveguide film 601 is fixed to the light emitting device and the light receiving device with transparent adhesive. This procedure avoids the necessity of a solder reflow process, and hence reduces the necessary heat resistance in the optical waveguide film. When such a procedure without a solder reflow process is adopted, low-level heat resistance for ordinary usage environment is sufficient in the optical waveguide film 601. Thus, general-purpose thermoplastic materials can be used as the core and clad materials. This avoids the necessity of the use of fluorinated polyimide, inorganic and organic hybrid material, and the like which have high heat resistance but are expensive.

The optical waveguide module 600 allows optical wiring between main boards almost without the necessity of changing the main board material and the electrical circuit layout. Further, the optical waveguide film has flexibility and high speed performance, as well as the property of EMC (Electro-Magnetic Compatibility) which results from the connection by means of optical signals. Thus, such an optical waveguide module 600 allows the main boards to be interconnected at high speeds, and further permits the use in a state that the connection section is bent. Furthermore, the optical waveguide film is provided with metallic wiring, and hence can connect the devices electrically in addition to optically. From the above-mentioned features, the optical waveguide module 600 is most suitable for inter-housing connection in a foldable portable phone and a foldable notebook personal computer. Further, when the optical waveguide module is used for introducing optical wiring into an arbitrary position within a main board, the degree of freedom is increased in the layout.

In the optical waveguide module 600, both a light receiving device and a light emitting device may be mounted on each of the first sub-board 603 and the second sub-board 605. Then, a plurality of corresponding cores may be formed. In this configuration, an optical signal emitted from the light emitting device of the first sub-board 603 is led to the light receiving device of the second sub-board 605. On the contrary, an optical signal emitted from the light emitting device of the second sub-board 605 is led to the light receiving device of the first sub-board 603. As such, two-way communication is achieved. More preferably, light emitting devices each emitting a different wavelength may be arranged at each end of the optical waveguide film 601 so that two-way communication may be achieved by wavelength multiplexing. This configuration allows two-way communication even when the optical waveguide film includes merely a single core. Thus, wiring thickness can be reduced extremely. This is notably effective especially in the mounting in a device where merely a limited space is allowed.

Embodiment 8 has been described for the case that the optical waveguide module 600 is provided with an optical waveguide film 550 according to Embodiment 5. However, an optical waveguide film according to any embodiment may be used.

Below is a comparison between the optical wiring using an optical waveguide film according to the embodiments and the prior art coaxial cable wiring. In the case of prior art coaxial cable wiring, from the consideration of mode dispersion, a smaller wiring diameter is preferable for increasing the transmission speed. Nevertheless, a smaller wiring diameter in the coaxial cable wiring increases the loss and hence the power consumption. Thus, an optimum wiring diameter is present for trading off the transmission speed with the power consumption. In general, the wiring diameter in the coaxial cable wiring is a few hundred μm. Further, in order to prevent interference with adjacent wiring, spacing of a few hundred μm or greater is necessary in the arrangement of the wiring. Thus, in the coaxial cable wiring, the wiring width increases inevitably.

In contrast, in the optical waveguide film, the core size is 30–50 μm. Further, spacing of 20 μm or the like between adjacent optical waveguides is sufficient for average interference. Thus, in case of the same number of wirings, the wiring thickness in the optical waveguide film can be reduced to at least 1/5–1/10 in comparison with the prior art coaxial cable wiring.

Thus, in a portable phone employing the optical waveguide module in the wiring, when merely thin wiring is passed through the connection section, signal exchange is achieved equivalent to that using the prior art coaxial cable wiring. Further, electric connectors can be omitted that have been necessary for the coaxial cable wiring and have required a large volume. This reduces a mechanical restriction. Thus, the size of the hinge portion itself is reduced. This allows the introduction of a mechanism for the connection section having more degrees of freedom. Further, the optical waveguide film allows high speed transmission between the housings, and has a very high EMC effect. This improves the antenna sensitivity, allows size reduction in the antenna, and reduces the number of necessary electric shield components.

Embodiment 9

FIGS. 26–29 are external views of portable phones serving as specific examples of the application of a portable device employing an optical waveguide film described in the above-mentioned embodiments. Examples of the shape of a connection section employing the optical waveguide film are described below with reference to the drawings.

Figures 26A, 26B:
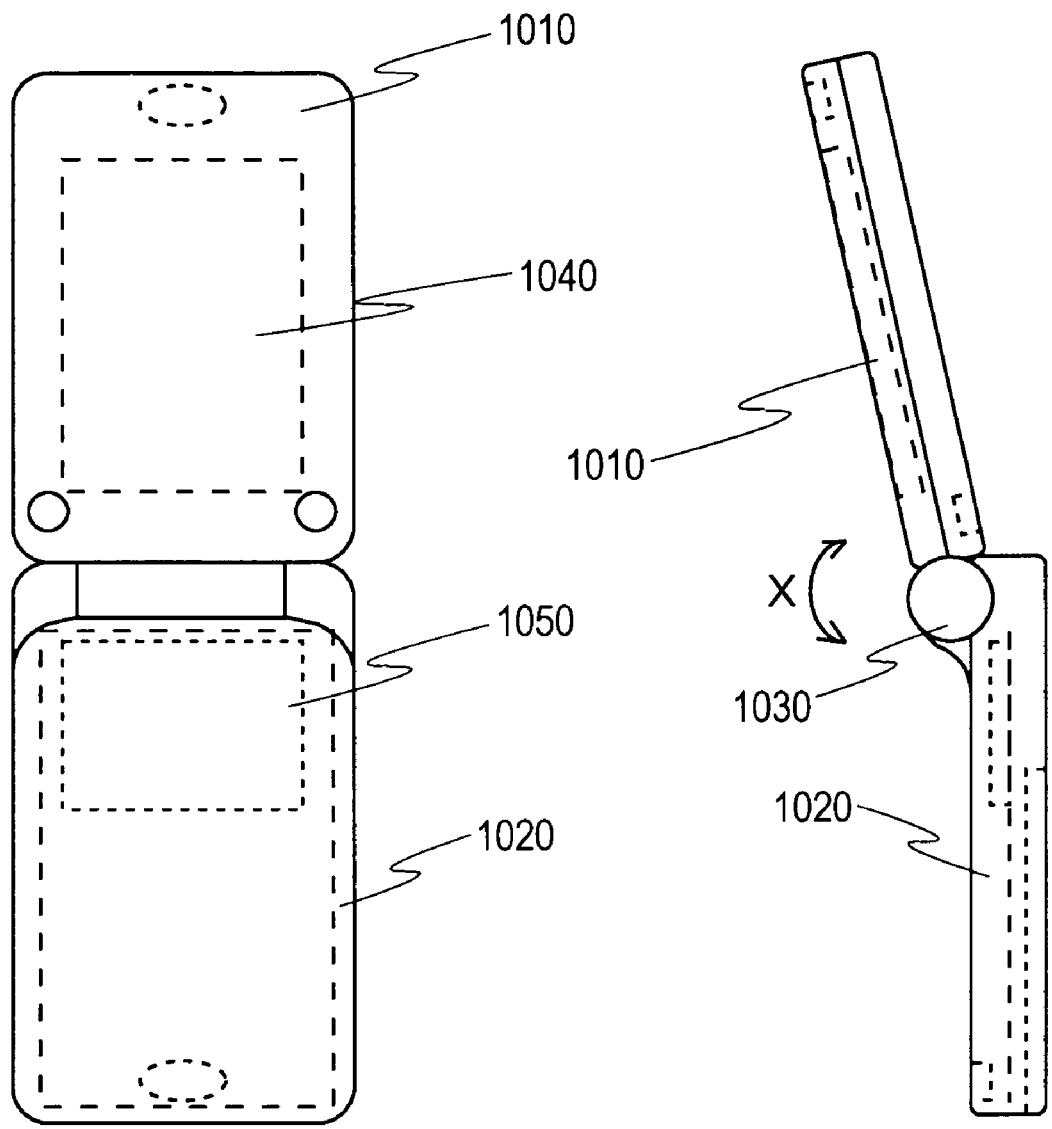
FIG. 26A is a front view of a portable phone according to Embodiment 9.
FIG. 26B is a side view of a portable phone according to Embodiment 9.

FIG. 26A is a front view of a portable phone according to Embodiment 9. FIG. 26B is a side view of the portable phone according to Embodiment 9. This portable phone 1000 comprises a first housing 1010, a second housing 1020, and a connection section 1030 composed of a hinge. The first housing 1010 includes a first board 1040 provided with a display unit for displaying an image. The second housing 1020 includes a second board 1050 provided with input keys, a control circuit, and the like. The connection section 1030 connects the first housing 1010 with the second housing 1020 in a manner rotatable in the X direction so that the two housings are connected in a foldable manner. The portable phone 1000 has basically the same structure as the devices described above with reference to FIGS. 1, 10, and 12. Thus, the first board 1040 and the second board 1050 are interconnected through an optical waveguide film described in the embodiments.

Figures 27A, 27B:
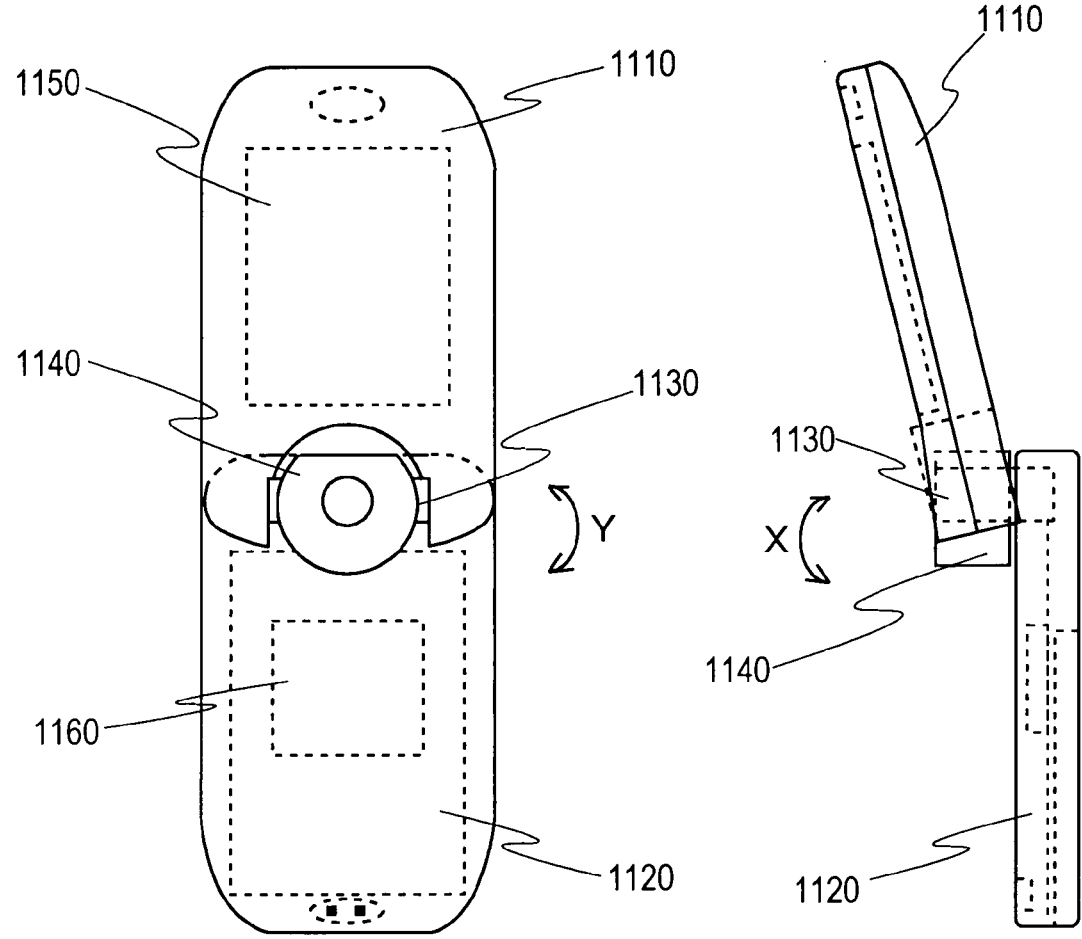
FIG. 27A is a front view of a portable phone according to a first modification of Embodiment 9.
FIG. 27B is a side view of a portable phone according to a first modification of Embodiment 9.

FIG. 27A is a front view of a portable phone according to a first modification of Embodiment 9. FIG. 27B is a side view of the portable phone according to the first modification of Embodiment 9. This portable phone 1100 comprises a first housing 1110, a second housing 1120, a connection section 1130 composed of a hinge, and a connection section 1140. The first housing 1110 includes a first board 1150 provided with a display unit for displaying an image. The second housing 1120 includes a second board 1160 provided with input keys, a control circuit, and the like. The connection section 1130 connects the first housing 1110 with the second housing 1120 in a manner rotatable in the X direction so that the two housings are connected in a foldable manner. The connection section 1140 connects the first housing 1110 with the second housing 1120 in a manner rotatable in the Y direction so that the two housings are connected in a manner rotatable in plane. The portable phone 1100 has basically the same structure as the device described above with reference to FIG. 14. Thus, the first board 1150 and the second board 1160 are interconnected through an optical waveguide film described in the embodiments.

Figures 28A, 28B:
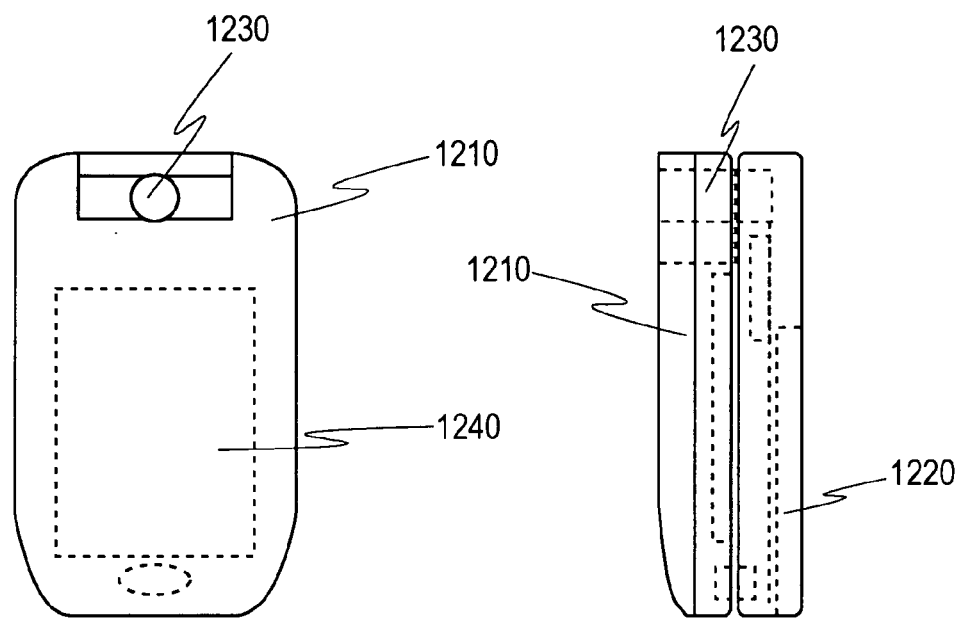
FIG. 28A is a front view of a portable phone according to a second modification of Embodiment 9.
FIG. 28B is a side view of a portable phone according to a second modification of Embodiment 9.
Figure 28C:
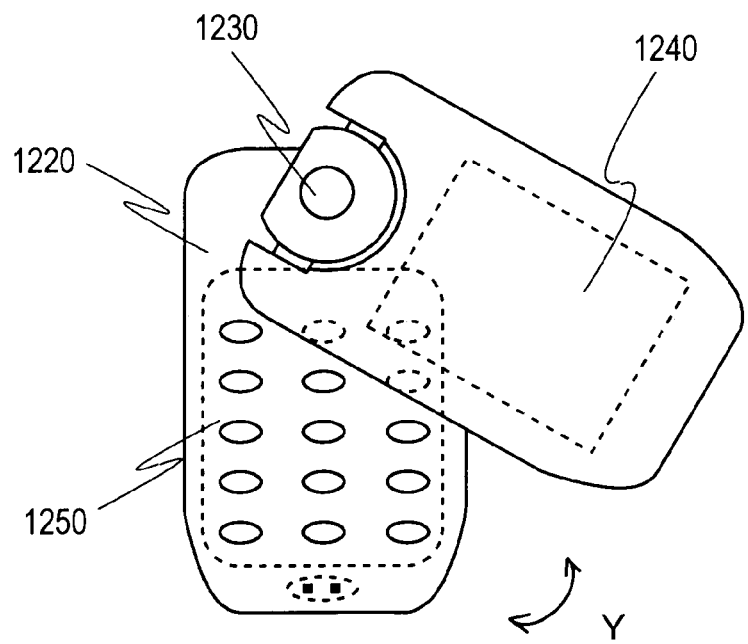
FIG. 28C is a front view of a portable phone according to a second modification of Embodiment 9, in a state that a housing is rotated.

FIG. 28A is a front view of a portable phone according to a second modification of Embodiment 9. FIG. 28B is a side view of the portable phone according to the second modification of Embodiment 9. FIG. 28C is a front view of the portable phone according to the second modification of Embodiment 9 in the case that the housing is rotated. This portable phone 1200 comprises a first housing 1210, a second housing 1220, and a connection section 1230. The first housing 1210 includes a first board 1240 provided with a display unit for displaying an image. The second housing 1220 includes a second board 1250 provided with input keys, a control circuit, and the like. The connection section 1230 connects the first housing 1210 with the second housing 1220 in a manner rotatable in the Y direction so that the two housings are connected in a foldable manner. In the portable phone 1200, the first board 1240 and the second board 1250 are interconnected through an optical waveguide film described in the embodiments.

Figure 29A:
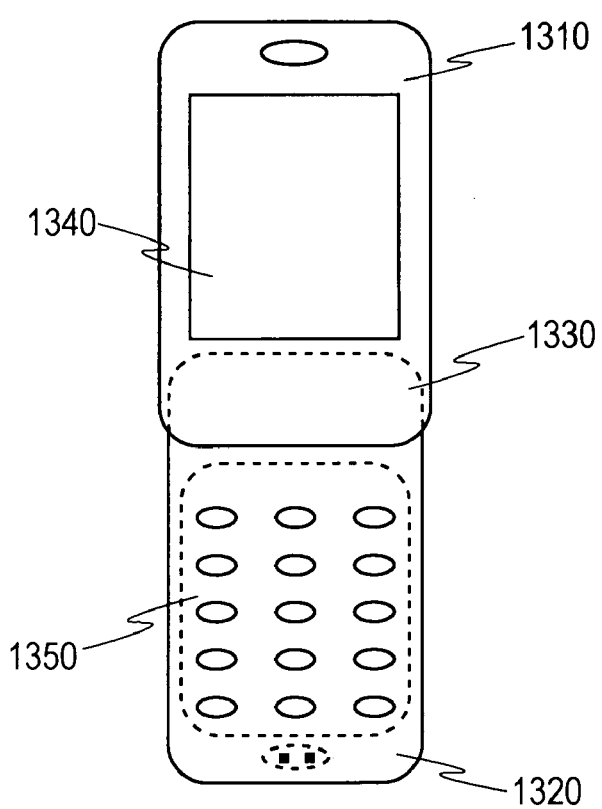
FIG. 29A is a front view of a portable phone according to Embodiment 9.
Figure 29B:
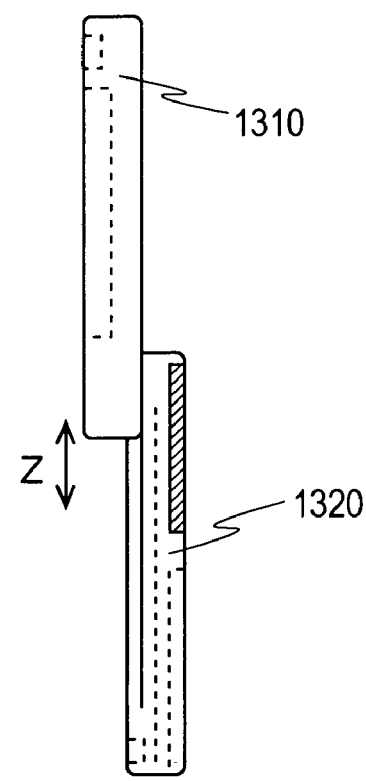
FIG. 29B is a side view of a portable phone according to Embodiment 9.

FIG. 29A is a front view of a portable phone according to a third modification of Embodiment 9. FIG. 29B is a side view of the portable phone according to the third modification of Embodiment 9. This portable phone 1300 comprises a first housing 1310, a second housing 1320, and a connection section 1330. The first housing 1310 includes a first board 1340 provided with a display unit for displaying an image. The second housing 1320 includes a second board 1350 provided with input keys, a control circuit, and the like. The connection section 1330 connects the two housings in such a manner that the second housing 1320 can slide over the first housing 1310 in the Z direction. This reduces the dimension in the longitudinal direction when the housings are closed. In the portable phone 1300, the first board 1340 and the second board 1350 are interconnected through an optical waveguide film described in the embodiments.

As described above, each portable phone according to Embodiment 9 comprises a first housing, a second housing, and a connection section for connecting the first housing and the second housing in such a manner that the relative position of the housings is variable. Further, signal connection between the housings is performed through an optical waveguide film. This realizes a portable device which is compact and thin when the housings are closed.

In the above, new configurations have been described in detail. The description given above is completely illustrative, and does not limit the scope of the present invention. It should be noted that various improvements and modulations can be devised without departing from the scope of the present invention.

What is claimed is:

1. A portable device comprising:
    a first housing;
    a first board provided in the first housing;
    a second housing;
    a second board provided in the second housing;
    a connection section including a hinge for connecting the first housing with the second housing in such a manner that a position of the first housing relative to the second housing can be changed; and
    an optical waveguide film having at least one optical waveguide for connecting the first board with the second board through optical wiring, the optical waveguide film being arranged obliquely relative to a pivot axis of the hinge, the optical waveguide film having a bend formed prior to connecting the first board with the second board by heating, softening, and bending the optical waveguide film.

2. A portable device as claimed in claim 1, wherein the optical waveguide film is arranged obliquely such that a helix angle between the optical waveguide film and the pivot axis of the hinge is an acute angle in a range of 15° to 45°.

3. A portable device as claimed in claim 1, wherein the optical waveguide film is arranged so that the bend of the optical waveguide film is bent around the pivot axis of the hinge.

4. A portable device comprising:
    a first housing;
    a first board provided in the first housing;
    a second housing;
    a second board provided in the second housing;
    a connection section including a hinge for connecting the first housing with the second housing in a foldable manner such that a position of the first housing relative to the second housing can be changed; and
    an optical waveguide film having at least one optical waveguide for connecting the first board with the second board through optical wiring;
    wherein the optical waveguide film has a helix angle causing a helix pitch corresponding to a value obtained by dividing a maximum opening and closing angle between the first housing and the second housing by 360° to be smaller than or equal to the width of the hinge in the direction of a pivot axis.

5. A portable device comprising:
    a first housing;
    a first board provided in the first housing;
    a second housing;
    a second board provided in the second housing;
    a connection section for connecting the first housing with the second housing in such a manner that a position of the first housing relative to the second housing can be changed; and
    an optical waveguide film having at least one optical waveguide for connecting the first board with the second board through optical wiring, the optical waveguide film including:
        a core corresponding to the at least one waveguide; and
        a clad arranged so as to surround the core; and
    electric wiring arranged along with the core,
    wherein a part of the electric wiring contacts with the core and thereby prevents the leakage of an optical signal from the core.

6. A portable device as claimed in claim 5, wherein the electric wiring contacts with the core in a portion where the optical waveguide film is bent in use.

* * * * *

UNITED STATES PATENT AND TRADEMARK OFFICE
CERTIFICATE OF CORRECTION

| | | |
|---|---|---|
| PATENT NO. | : 7,184,617 B2 | Page 1 of 1 |
| APPLICATION NO. | : 11/076068 | |
| DATED | : February 27, 2007 | |
| INVENTOR(S) | : Tsuguhiro Korenaga et al. | |

It is certified that error appears in the above-identified patent and that said Letters Patent is hereby corrected as shown below:

On the Title Page

Item (57), Abstract, line 4, please change "device includes" to --device includes:--.

Signed and Sealed this

Nineteenth Day of June, 2007

JON W. DUDAS
*Director of the United States Patent and Trademark Office*